(12) United States Patent
Loganathan et al.

(10) Patent No.: US 10,607,284 B2
(45) Date of Patent: *Mar. 31, 2020

(54) SYSTEM AND METHOD TO SEARCH AND VERIFY BORROWER INFORMATION USING BANKING AND INVESTMENT ACCOUNT DATA AND PROCESS TO SYSTEMATICALLY SHARE INFORMATION WITH LENDERS AND GOVERNMENT SPONSORED AGENCIES FOR UNDERWRITING AND SECURITIZATION PHASES OF THE LENDING CYCLE

(71) Applicant: Early Warning Services, LLC, Scottsdale, AZ (US)

(72) Inventors: Ravi Loganathan, Charlotte, NC (US); Ronald Scott Alcorn, Austin, TX (US); Sandra Letterly, Scottsdale, AZ (US); James Kaufman, Scottsdale, AZ (US); Laura Weinflash, Scottsdale, AZ (US)

(73) Assignee: Early Warning Services, LLC, Scottsdale, AZ (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/970,212

(22) Filed: Dec. 15, 2015

(65) Prior Publication Data
US 2016/0104238 A1     Apr. 14, 2016

Related U.S. Application Data

(63) Continuation-in-part of application No. 14/959,881, filed on Dec. 4, 2015, now abandoned, which is a
(Continued)

(51) Int. Cl.
*G06Q 40/02*     (2012.01)

(52) U.S. Cl.
CPC .......... *G06Q 40/025* (2013.01); *G06Q 40/02* (2013.01)

(58) Field of Classification Search
CPC ............................ G06Q 40/025; G06Q 40/02
See application file for complete search history.

(56) References Cited

U.S. PATENT DOCUMENTS 6,317,745 B1    11/2001   Thomas et al.
6,658,393 B1    12/2003   Basch et al.
(Continued)

FOREIGN PATENT DOCUMENTS

WO     2012177786 A1    12/2012

OTHER PUBLICATIONS

International Search Report and Written Opinion for PCT/US2012/043380 dated Sep. 14, 2012, all pages.
(Continued)

*Primary Examiner* — Kenneth Bartley
(74) *Attorney, Agent, or Firm* — Kilpatrick Townsend & Stockton LLP

(57) ABSTRACT

Account data (e.g., balance information) for accounts at a plurality of financial institutions (or government agencies) is stored (and updated) in a central database system and accessed using a personal identifier, such as a social security number. Risk data may be generated for accounts based on the account data. The account data and risk data are accessed in response to either an account search request (e.g., from a government entity and relating to a benefits program or a subpoena) or an account verification request (e.g. from a mortgage company and relating to a mortgage application).

16 Claims, 21 Drawing Sheets

Related U.S. Application Data continuation-in-part of application No. 13/213,975, filed on Aug. 19, 2011, now abandoned.

(60) Provisional application No. 61/499,599, filed on Jun. 21, 2011.

(56) References Cited

U.S. PATENT DOCUMENTS

| | | | |
|---|---|---|---|
| 7,139,734 B2 | 11/2006 | Nathans et al. | |
| 7,337,953 B2 | 3/2008 | Sgambati et al. | |
| 7,818,228 B1 | 10/2010 | Coulter | |
| 7,954,698 B1 | 6/2011 | Pliha | |
| 8,099,345 B2 | 1/2012 | Stellhorn et al. | |
| 8,229,806 B1* | 7/2012 | Chapman | G06Q 40/00 705/30 |
| 8,396,768 B1 | 3/2013 | Kaisermayr | |
| 8,676,611 B2 | 3/2014 | McLaughlin et al. | |
| 8,682,764 B2 | 3/2014 | Love et al. | |
| 9,892,465 B2 | 2/2018 | Love et al. | |
| 10,013,655 B1 | 7/2018 | Clark | |
| 10,133,980 B2 | 11/2018 | Turner et al. | |
| 2001/0029482 A1* | 10/2001 | Tealdi | G06Q 20/105 705/38 |
| 2002/0040344 A1* | 4/2002 | Preiser | G06Q 20/102 705/42 |
| 2002/0062281 A1 | 5/2002 | Singhal | |
| 2002/0091635 A1 | 7/2002 | Dilip et al. | |
| 2003/0009418 A1* | 1/2003 | Green | G06Q 10/087 705/38 |
| 2003/0130949 A1* | 7/2003 | Ahles | G06Q 20/042 705/45 |
| 2003/0149646 A1 | 8/2003 | Chen et al. | |
| 2003/0187826 A1 | 10/2003 | Kennedy et al. | |
| 2004/0078323 A1 | 4/2004 | Johnston et al. | |
| 2004/0153650 A1 | 8/2004 | Hillmer | |
| 2005/0049969 A1* | 3/2005 | Kane | G06Q 20/04 705/45 |
| 2005/0211763 A1 | 9/2005 | Sgambati et al. | |
| 2005/0273423 A1* | 12/2005 | Kiai | G06Q 30/08 705/38 |
| 2005/0289058 A1 | 12/2005 | Hoffman et al. | |
| 2006/0031239 A1 | 2/2006 | Koenig | |
| 2006/0080197 A1 | 4/2006 | Chi | |
| 2006/0116952 A1* | 6/2006 | Orfano | G06Q 20/10 705/38 |
| 2006/0191995 A1 | 8/2006 | Stewart et al. | |
| 2006/0259766 A1 | 11/2006 | Rasti | |
| 2007/0022008 A1 | 1/2007 | Kingsborough et al. | |
| 2007/0095899 A1 | 5/2007 | Meade et al. | |
| 2007/0204033 A1 | 8/2007 | Bookbinder et al. | |
| 2008/0040275 A1 | 2/2008 | Paulsen et al. | |
| 2008/0091593 A1 | 4/2008 | Egnatios et al. | |
| 2008/0243715 A1 | 10/2008 | Stellhorn et al. | |
| 2008/0288382 A1 | 11/2008 | Smith et al. | |
| 2009/0319414 A1 | 12/2009 | DeBie | |
| 2010/0185656 A1 | 7/2010 | Pollard | |
| 2010/0241558 A1 | 9/2010 | Chmielewski et al. | |
| 2010/0250407 A1 | 9/2010 | Silva | |
| 2010/0268696 A1* | 10/2010 | Nightengale | G06Q 40/02 707/694 |
| 2010/0332390 A1 | 12/2010 | Paintin | |
| 2011/0087495 A1* | 4/2011 | O'Neill | G06Q 10/10 705/1.1 |
| 2011/0125671 A1 | 5/2011 | Zhang et al. | |
| 2011/0131122 A1 | 6/2011 | Griffin et al. | |
| 2011/0153383 A1 | 6/2011 | Bhattacharjya et al. | |
| 2011/0295739 A1 | 12/2011 | Rice et al. | |
| 2012/0109806 A1 | 5/2012 | Willard et al. | |
| 2012/0123942 A1 | 5/2012 | Song et al. | |
| 2012/0226590 A1 | 9/2012 | Love et al. | |
| 2012/0239557 A1 | 9/2012 | Weinflash et al. | |
| 2012/0330689 A1 | 12/2012 | McLaughlin et al. | |
| 2012/0330819 A1* | 12/2012 | Weinflash | G06Q 40/02 705/38 |
| 2013/0335419 A1 | 12/2013 | Bondesen et al. | |
| 2014/0222631 A1 | 8/2014 | Love et al. | |
| 2016/0044048 A1 | 2/2016 | Hamidi et al. | |
| 2016/0086263 A1 | 3/2016 | Weinflash et al. | |
| 2016/0196605 A1 | 7/2016 | Loganathan et al. | |

OTHER PUBLICATIONS

Anonymous, "Social Enterprise Management," Policy & Practice, Mar. 2005; 63(1), pp. 5-6. Retrieved from http://search.proquest.com/docview/2081952?accountid=14753.

Bagdasaryan, S., "Noncompliance with Welfare-to-Work Requirements: Examining the Determinants of Behavior," Dissertation. University of California, 2005. 188 pages. Retrieved from http://search.proquest.com/dooview/305033610?accountid=14753.

Final Office action dated Jun. 13, 2018 in U.S. Appl. No. 15/069,186, all pages.

Non-Final Office action dated Feb. 21, 2019 in U.S. Appl. No. 15/069,186, all pages.

Itzhak Roth, Financial inference networks: A framework for financial problem-solving and decision-making, 1992, Temple University, pp. 1-280. (Year: 1992).

* cited by examiner

| DATA FIELDS | INITIAL | DAY 1 | DAY 2 | DAY 3 | ... | CURRENT DAY |
|---|---|---|---|---|---|---|
| RTN | XXXX | — | — | — | | — |
| ACCT. NO. | XXXX | — | — | — | | — |
| ACCT. TYPE | XXXX | — | — | — | | — |
| SSN / TAX ID | XXXX | XXXX | XXXX | XXXX | | XXXX |
| ACCT. STATUS | XXXX | XXXX | XXXX | XXXX | | XXXX |
| NAME | XXXX | XXXX | XXXX | XXXX | | XXXX |
| AUTH. SIGNERS | XXXX | XXXX | XXXX | XXXX | | XXXX |
| ADDRESS | XXXX | XXXX | XXXX | XXXX | | XXXX |
| EMAIL ADDR. | XXXX | XXXX | XXXX | XXXX | | XXXX |
| PHONE NO. | XXXX | XXXX | XXXX | XXXX | | XXXX |
| DOB | XXXX | XXXX | XXXX | XXXX | | XXXX |
| DATA DATE | XXXX | XXXX | XXXX | XXXX | | XXXX |
| BALANCE | XXXX | XXXX | XXXX | XXXX | | XXXX |
| AVG. BAL. | XXXX | XXXX | XXXX | XXXX | | XXXX |
| INT. PAID | XXXX | XXXX | XXXX | XXXX | | XXXX |
| MATURITY DATE | XXXX | XXXX | XXXX | XXXX | | XXXX |
| RISK FLAG | XXXX | | | | | |

*FIG. 2*

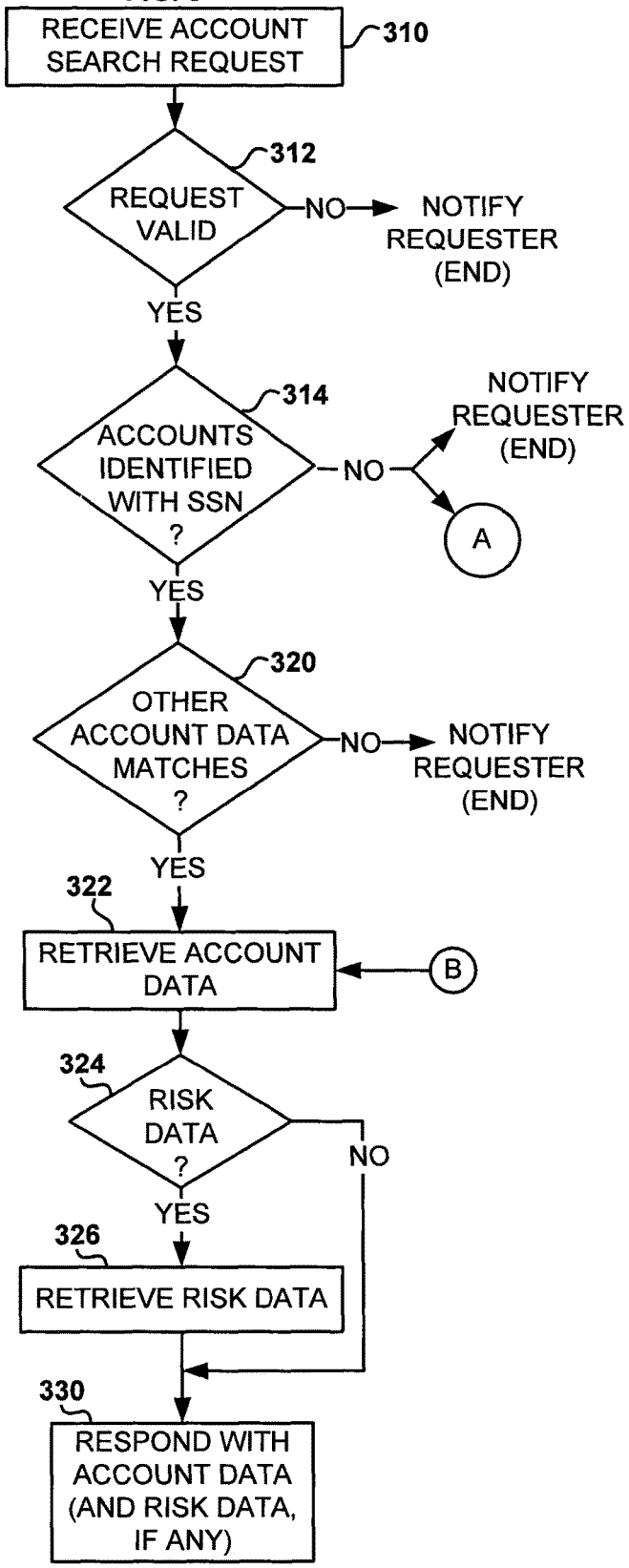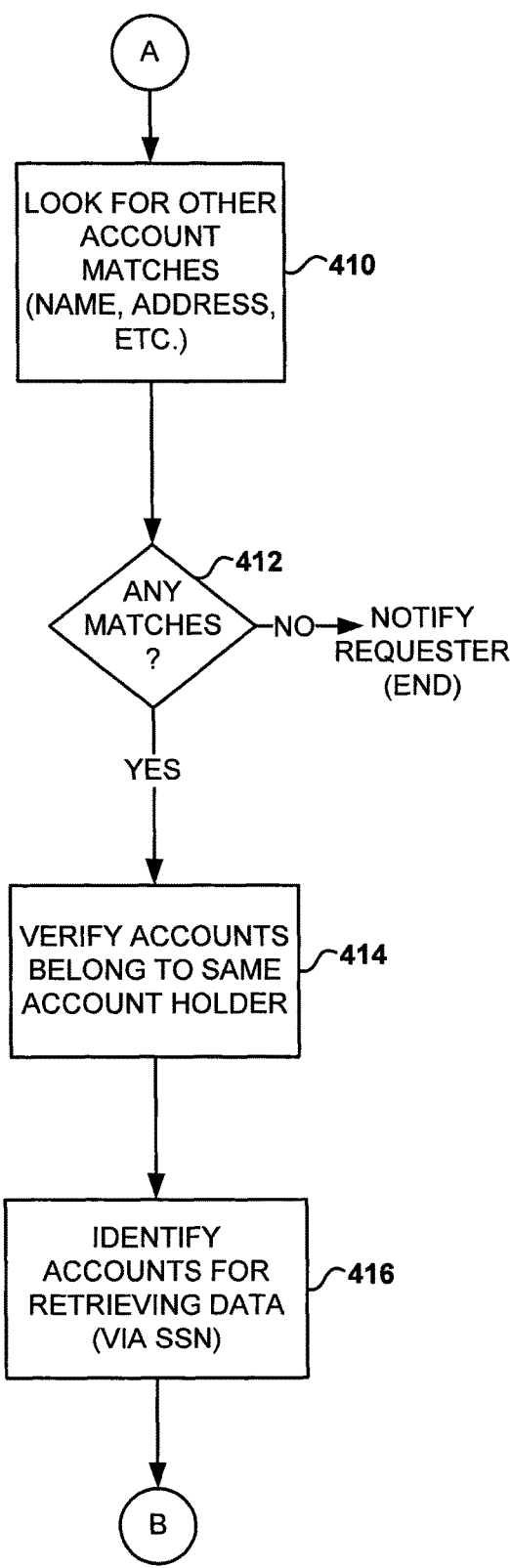

SYSTEM AND METHOD TO SEARCH AND VERIFY BORROWER INFORMATION USING BANKING AND INVESTMENT ACCOUNT DATA AND PROCESS TO SYSTEMATICALLY SHARE INFORMATION WITH LENDERS AND GOVERNMENT SPONSORED AGENCIES FOR UNDERWRITING AND SECURITIZATION PHASES OF THE LENDING CYCLE

CROSS-REFERENCES TO RELATED APPLICATIONS

This patent application is a continuation-in-part of U.S. patent application Ser. No. 14/959,881 filed Dec. 4, 2015 and titled "SYSTEM AND METHOD FOR LOCATING AND ACCESSING ACCOUNT DATA TO VERIFY INCOME", which is a continuation-in-part of U.S. patent application Ser. No. 13/213,975 filed Aug. 19, 2011 and titled "SYSTEM AND METHOD FOR LOCATING AND ACCESSING ACCOUNT DATA", which claims priority to U.S. Provisional Patent Application No. 61/499,599 entitled, "SYSTEMS AND METHODS FOR FRAUD DETECTION/PREVENTION FOR A BENEFITS PROGRAM," filed Jun. 21, 2011, the complete disclosures of which are hereby incorporated by reference herein for all purposes.

BACKGROUND OF THE INVENTION

Account balance and other information for accounts held by an account owner are often needed by third parties for various reasons. For example, when applying for a mortgage, an applicant is typically required to provide information on all of the applicant's accounts to ensure there is sufficient cash attributable to the applicant (e.g., to use as a down payment). As another example, when applying for government benefits, such as supplemental security income (SSI) or other cash or services programs, a beneficiary's accounts must be located to ensure available assets have not been illegally transferred or do not otherwise exceed any qualification amount limits.

Searching for and verifying account balances can be difficult and time consuming. For example, in the case of a mortgage application, where an applicant has a number of accounts at different banks or other institutions (as used herein, "institutions" may include any type of financial service organizations, such as banks, credit unions, third-party payment services such as PayPal or the like, online banking services, online virtual money account systems, investment firms, brokerages, credit card companies, loan companies, check cashing services, payday loan services, government institutions, or any other entity providing financial services or information), verifying account balances may involve sending written requests to a number of different institutions, and each institution conducting a manual look-up for each specified account. Further, the applicant may not have complete account numbers or may not remember or provide information on all accounts. Even if the applicant has account numbers, the applicant may not provide the correct bank name or ID (such as a routing and transit number) to enable convenient and timely verification. In other cases, when the applicant has all the necessary account information, and even if a current balance has been confirmed by a bank, that balance may not be legitimate. That is, an applicant may have received or borrowed funds from another person (such as a relative) to temporarily show an account balance larger than what is actually owned by the account holder, to fraudulently qualify for a mortgage, loan, or government benefit.

In the case of an application for government benefits, an applicant may not disclose accounts, or income reflected in those accounts that would result in disqualification under the benefits program, or may have made transfers out of accounts to conceal assets.

Further, government and law enforcement agencies may from time to time have need to execute and serve subpoenas or National Security Letters ("NSLs") pursuant to 18 U.S.C. § 2709 (or other applicable statutes) to institutions to gain access to financial accounts or information for individuals or entities (such as corporations) named in such subpoenas. However, it is time consuming and expensive for such government and law enforcement agencies to locate which institutions may have information regarding an individual or entity named in a subpoena, and the institutions waste significant resources and expense responding to such subpoenas especially when there is no account or financial information for the named individual or entity that is accessible by the particular institution. The problem is magnified by the current approach of law enforcement to take a "shotgun" approach by delivering subpoenas or NSLs to a large number of major institutions in an attempt to find any applicable accounts for a person or entity of investigatory interest.

Thus, there is a need for systems and methods to locate, verify and/or access account information, especially for accounts that are maintained across a number of different institutions.

BRIEF SUMMARY OF THE INVENTION

Embodiments of the present invention provide systems and methods for locating and accessing assets, such as accounts. For purposes of the present disclosure, accounts may include, but are not limited to, deposit accounts such as checking, savings, CDs, money market accounts in the United States, or International accounts. Accounts may also include (i) reward or loyalty accounts providing merchant reward points, such as in the exemplary case of retail sales; (ii) online financial accounts such as PayPal accounts; (iii) online gaming such as Farmville or Second Life; or (iv) frequent flyer programs or stored value accounts. Further, accounts may include credit or loan accounts, credit card accounts, debit accounts, prepaid accounts, or any account regarding any desired type of financial information.

According to one aspect, a system includes a database storing data for accounts from a plurality of institutions. The stored data for each respective account comprises at least a personal identifier for an account holder of that respective account. The system further includes a processor configured to receive a request to locate assets. The request includes a submitted personal identifier, and the processor is configured to automatically locate one or more accounts by matching the submitted personal identifier to a personal identifier stored in the database for the located accounts. The processor is further configured to retrieve from the database stored data associated with the located accounts, and to produce a report. The report indicates the assets contained in the one or more located accounts, and the report also indicates a pattern of deposits into at least one of the located accounts. The processor is further configured to provide the report to an entity from which the request to locate assets was received.

According to another aspect, a computer-implemented method comprises providing a database and storing, in the database, account data for accounts maintained at a plurality of institutions. The account data for each respective account comprises at least a personal identifier for an account holder of that respective account. The method further comprises receiving a request to locate assets, the request including a submitted personal identifier, and automatically locating one or more accounts by matching the submitted personal identifier to the personal identifier stored in the database for the located accounts. The method further comprises retrieving at least some of the account data for the located accounts, and producing a report. The report indicates the assets contained in the one or more located accounts, and the report also indicates a pattern of deposits into at least one of the located accounts. The method further comprises providing the report to an entity from which the request to locate assets was received.

According to another aspect, a system comprises a database storing data for accounts from a plurality of institutions. The stored data for each respective account comprises at least a personal identifier for an account holder of that respective account. The system further includes a processor configured to receive, from a first requesting entity, a request to locate assets. The request includes a submitted personal identifier, and the processor is configured to automatically locate one or more accounts by matching the submitted personal identifier to a personal identifier stored in the database for the located accounts. The processor is further configured to retrieve from the database stored data associated with the located accounts, to produce a report that indicates the assets contained in the one or more located accounts, and to provide the report to the first requesting entity. The processor is further configured to receive, from a second requesting entity at a time later than the production of the report, a request for information contained in the report, the request including an identifier of the report, and to provide information contained in the report to the second requesting entity.

Embodiments of the invention provide systems and methods for linking data from a plurality of data sources, and using the linked data for analysis, such as risk assessment. In order to link the data, data elements of a data record are examined for characteristics that may be shared with data elements of other data records. In one embodiment, data records having data elements with similar or shared characteristics are stored in a data structure as virtual nodes and linked together in a network of data nodes. Each network is associated with one or more entities. Through identification and analysis of such networks, many types of risks may be identified and mitigated, including multiple types of bank fraud activities. These bank fraud activities may include, but are not limited to money laundering, terrorist finance activity, account takeover, demand deposit account fraud and credit card first party fraud. In various embodiments, networks are identified by the creation of social network links across data from multiple sources through the analysis of entity relationships and behavioral patterns. These patterns and relationships are in turn determined from the application of analysis techniques to the multiple data sources, thereby uncovering hidden relationships between people, data, devices, and behavior. In one embodiment, a system and method is provided for linking data from a plurality of data sources. Data records from the data sources are received at a processing system. Each data record is parsed to identify and possibly modify one or more data elements, and data elements from different data records are compared to determine if any two data elements have common characteristics. When a data element from one data record has a characteristic in common with a data element from another data record, a linking identifier is created that identifies the two data records as linked. The linked data records, and the linking identifier that identifies the data records as linked, are stored in a data storage device. When a data record is accessed by an end user referred to herein as a "data user," linking identifiers are used to access other linked data records.

BRIEF DESCRIPTION OF THE DRAWINGS

FIG. 2 illustrates exemplary data provided to and stored in the database system of FIG. 1.

FIG. 3-5 are flow diagrams illustrating several processes used within the database system of FIG. 1, for locating and accessing account data.

DETAILED DESCRIPTION OF THE INVENTION

Figure 1:
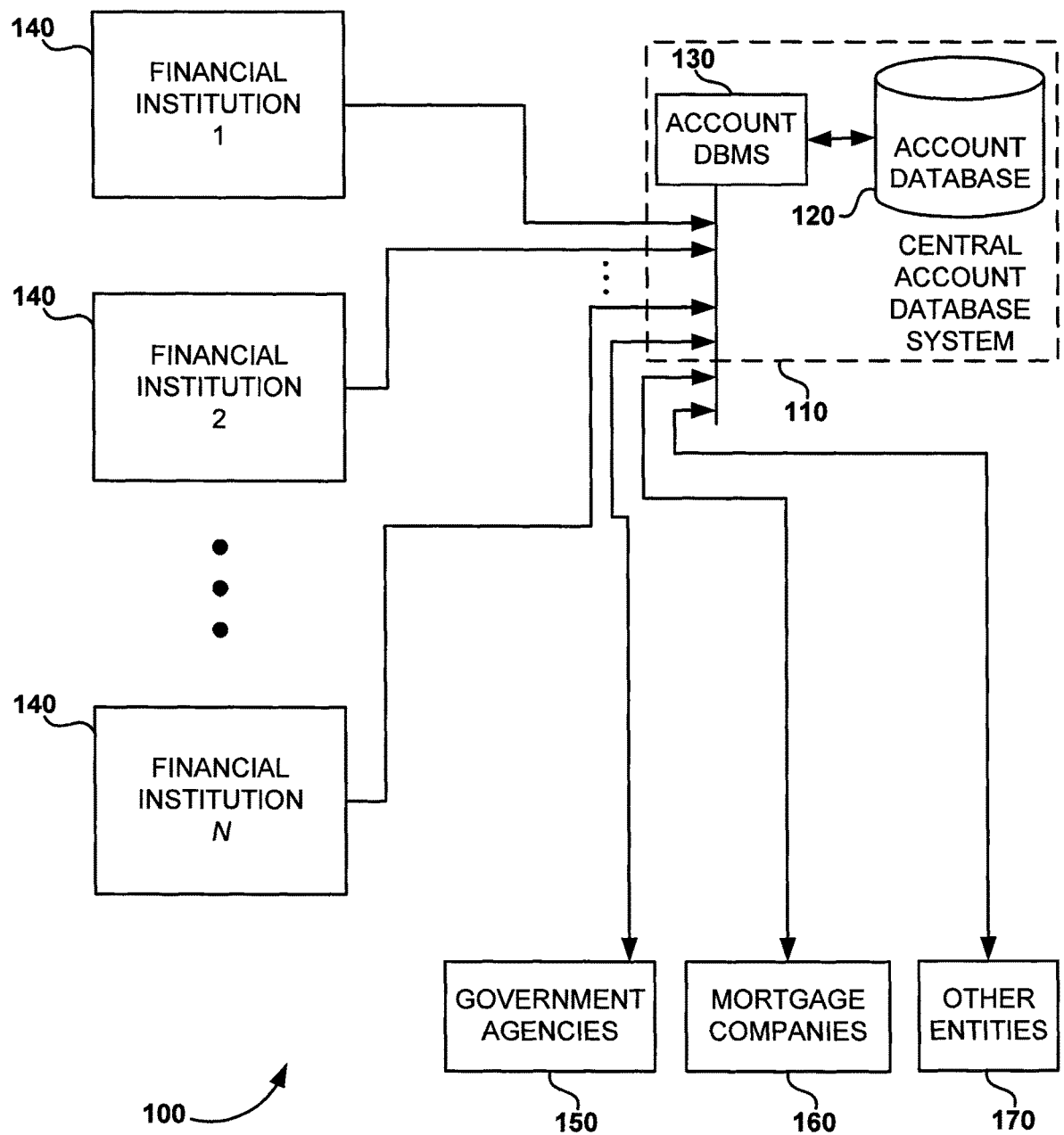
FIG. 1 is a block diagram of a system for locating and accessing account information in accordance with embodiments of the invention.

Described embodiments of the present invention provide means for enabling assets (such as financial accounts owned by an account holder) to be located and accessed, even when maintained at a number of different institutions. In some embodiments, accounts are located using a personal identifier associated with the account holder, rather than an account number. In one specific embodiment, the personal identifier is a social security number (SSN).

In certain described embodiments, a system for locating assets may receive two different types of requests to locate assets (such as financial accounts). One such request may be an asset search request, and the other may be an asset verification request.

Briefly, as examples, an asset search request might be used by a government entity to locate accounts of a person applying for welfare benefits or some other form of government assistance. Government programs providing benefits (particularly welfare benefits) often have criteria that permit applicants/beneficiaries to qualify only as long as their assets (such as checking, savings and other financial accounts) have balances below a specified threshold. As an example, in many states, a beneficiary must have no more than $2000 in assets in order to qualify for Medicaid nursing home benefits. The systems and methods described herein permit an asset search for any accounts held by the beneficiary in order to confirm that balances in accounts held by the beneficiary are in fact below the required threshold. In other embodiments, transaction data in an identified account may be evaluated to determine or verify benefits eligibility. For example, where benefits eligibility is based on or related to income, a system and method could additionally provide account data relevant to the risk that a beneficiary is receiving income (e.g., deposited into an account) that would make the beneficiary ineligible for benefits. As a more specific example, in the case of unemployment insurance benefits paid by a government agency, transaction data in an identified account could be evaluated to provide risk scores and/or indicators pertaining to whether there might be employment income deposited to an account that would make the account holder ineligible for receiving or continuing to receive unemployment benefits. Data reflecting the likelihood of employment income could be based on data provided for ACH transactions posted to the account (e.g., ACH data indicating payroll deposits), or for non-ACH deposits (e.g., check deposits), based on the payor name or account, the check amount, or other check deposit information (e.g., by comparing that information to prior employment data provided by the beneficiary or by comparing that information to transaction patterns or history). In some embodiments, the periodicity or timing of deposit transactions might be relevant and could be evaluated.

An asset verification request, on the other hand, might be used by an entity (such as a mortgage company) to verify account balances. For example, a mortgage applicant may state that the applicant has sufficient funds saved in one or more accounts to make a down payment (or sufficient funds saved to supplement income as needed to make mortgage payments). In this example, a mortgage company needs to verify that balances in the applicant's accounts are adequate to meet the applicant's financial needs after the mortgage has been granted.

Embodiments of the present invention support alternative asset search and verification queries or requests. For example, systems and methods as described herein may be used in various situations where account information (such as balances) may be needed, such as to qualify or comply with certain government programs, to obtain consumer/commercial loans, or to initiate legal or other actions. These other situations include (but are not limited to) programs involving cash or noncash welfare payments, health care assistance, Supplemental Nutrition Assistance Program (SNAP), Supplemental Security Income (SSI), child support requests (e.g., confirming financial means or needs), Housing Subsidies, Earned Income Tax Credits (EITC), corporate audit verifications, small business loans, student loans, student financial assistance, credit checks, and delinquent tax collections.

Other embodiments may support asset search and verification requests for various kinds of accounts or account information beyond those maintained at financial institutions. For example, government agencies may contribute benefits data, including details relating to those benefits and relating to the beneficiary, such as name, address, social security number (SSN), date of birth, employer (if any), date benefits applied for, type or amount of benefits, date benefits began, agency or agency location, and so forth. As should be appreciated, such information (particularly when accessible by using a personal identifier or SSN of the beneficiary), can be used to identify and assess the risk of fraud when processing a beneficiary's request for benefits.

In addition, systems and methods of the present invention permit account information from a large number of banking and other institutions as well as from government agencies to be stored in a single database system so that accounts across all of those institutions or agencies may be searched or verified with one request. Not only does this eliminate the need for contacting multiple institutions and agencies, but it also permits the data from individual accounts (or multiple accounts) to be analyzed for risk-related factors (e.g., in the case of mortgage applications, factors indicating savings patterns, suspicious deposits, and possible links to known fraudsters/con artists; and in the case of government benefits, factors indicating suspicious transfers to third parties or benefits received across multiple jurisdictions or agencies). In some embodiments, search or verification requests may be batched and sent daily. In other embodiments, an individual search or verification request can be sent electronically (on-line and in real-time), and an immediate response can be returned by the system. In one implementation, the located account information sent in the response can be immediately reviewed, perhaps in the presence of the applicant (e.g., while a mortgage applicant is in the presence of a mortgage officer), thus permitting the applicant to explain discrepancies and provide further information that can be used to refine subsequent requests, if appropriate. Such an exchange of information in real time may significantly reduce the time and cost of mortgage qualification, cash and services benefits applications and other processes requiring a search or verification of accounts.

Turning now to FIG. 1, there is shown an exemplary system 100 for locating and accessing account information. The account information is stored and processed at a central account database system 110 having a database device 120 for storing account information and an account database management system (DBMS) 130 for managing the data in database 120 (e.g., the DBMS stores, retrieves, arranges, sorts and processes the data in the database). As illustrated, the data used to populate the database 120 is obtained from a number of financial institutions 140. In addition, requests to access the account data stored in database system 110 may be received from government agencies 150 (e.g., to establish qualification for benefits), from mortgage companies 160 (e.g., to verify account balances) and from other entities 170 (e.g., needing to locate and access account data for various reasons, such as creditworthiness, ability to supply funds, or debt or asset verification).

The financial institutions 140 maintain financial accounts, and include banks, savings and loan associations, investment firms and similar institutions. The accounts for which data is provided may include checking accounts, savings accounts, certificates of deposit, brokerage accounts, money market accounts, and other financial accounts (in the United States or elsewhere). Accounts may also include (i) reward or loyalty accounts providing merchant reward points, such as in the exemplary case of retail sales; (ii) online financial accounts such as PayPal accounts; (iii) online gaming accounts, such as Farmville or Second Life accounts; or (iv) frequent flyer programs or stored value accounts. Further, accounts may include credit or loan accounts, credit card accounts, debit accounts, prepaid accounts, or any account regarding any desired type of financial information.

It should be appreciated that, while the embodiment illustrated in FIG. 1 assumes financial institutions will contribute data, and that government agencies, mortgage companies and other entities will access the data, in some cases the financial institutions 140 may also access account data in system 110 (e.g., as part of a loan application) and government agencies 150, mortgage companies 160 and other entities 170 may contribute account data (e.g., benefits accounts and mortgage accounts). Thus, in their broadest sense, financial institutions 140 may represent any kind of institution or other entity maintaining an account or asset (financial or otherwise), and government agencies 150, mortgage companies 160 and other entities 170 may represent any kind of entity (governmental, commercial or otherwise) wanting to locate and/or verify accounts or assets that are maintained at various institutions.

FIG. 2 illustrates exemplary data provided to (and stored in) the database system 110 by each of the financial institutions 140. In this particular example, the data comprises account data for a bank account, and thus includes the following data fields (collectively designated as 202 in FIG. 2):

Routing and Transit Number (RTN)
Account Number
Account Type (e.g., checking, savings, certificate of deposit, investment account)
Social Security Number (SSN)/Tax ID Number
Account Status (open/present, closed, deceased, non-sufficient funds, etc.)
Name of Account Holder(s)
Authorized Signor(s) of Account
Address(es) of Account Holder
Email Address(es) of Account Holder
Phone Number
Date of Birth (DOB) of Account holder
Data date (date of receipt by system 110)
Current Balance
Average Balance (e.g., average balance over the past 30 days)
Interest Paid
Maturity Date (e.g., maturity date for a certificate of deposit)

As should be appreciated, FIG. 2 shows data for only one account, and in practice there would be many accounts from many institutions stored in database system 110.

As seen in FIG. 2, the data includes an initial transfer 210 for each of the data fields (current and historical information at the time of the initial transfer), and subsequent periodic transfers 212-1 through 212-n for most of the same data fields (to keep the data updated). In FIG. 2, the illustrated periodic data transfers 212-1 through 212-n are each transferred and stored daily (Day 1, Day 2, Day 3, etc., up to the current day). Such a frequent updating is generally preferred, although is some embodiments and applications a less frequent updating might be acceptable. The updated data fields are illustrated as including the same data as the initial transfer, other than the RTN, Account Number and Account Type fields, since it is assumed, for purposes of the described embodiment, that these three data fields will remain unchanged over the life of the account.

Also, FIG. 2 shows each updated daily transfer of data (212-1 through 212-n) having all fields 202 in database system 110 populated with data (other than RTN, Account Number and Account Type). However, in practice, much of that data will not change between transfers, and so database system 110 may be managed so that only the changed data in a daily transfer will be stored (in such case, especially if updates are daily, many of the data fields illustrated in FIG. 2 would in fact not be populated in order to efficiently manage storage space and minimize unnecessary data processing). This filtering of unnecessary data could be implemented in one embodiment by database system 110 being programmed to review data fields as they are received from the financial institutions 140 and to remove data that has not changed since the day before. In another embodiment, the financial institutions 140 may have systems on-site and programmed to remove unchanged data before it is transmitted.

It should be appreciated that, since the data stored in database system 110 is likely to be extensive for any given account, the account data could be processed in a number of ways by system 110, in addition to being available to a requester making an account search or verification request. For example, the data could be processed to provide balance information in various forms (e.g., a single, current 30 day average balance, or average balances over 6 months, over 1 year or longer). The needs of the requester can thus be met by processing data in a way that is useful to the requester (e.g., a governmental entity is likely to need different information than a mortgage company). In a response the data associated with any account can be filtered, processed and stored in a way to provide only the information on the account that is most useful to the requester.

In addition, and as will be described in more detailed later, the data associated with an account can be analyzed (and, in some cases, compared to data from other, external sources) to provide risk scores or other risk-related data pertinent to the request. For example, the database system 110 may respond to a mortgage company request with not only basic account information (current status, current account balance, and average balance), but also with alerts and flags if critical data has recently changed (new signers, new account holder names, significant changes in balances, etc.). Also, patterns for deposits and withdrawals (e.g., as reflected in daily balances) can indicate if the account holder is a consistently good saver, or has relied on a single or a few large deposits in order to reach the current balance. If the entity managing the database system 110 provides risk-related data, then data stored in the database could also include a risk marker 216 (stored in a "Risk Flag" field as seen in FIG. 2) that indicates risk factors have been identified for the account. The risk marker could be as simple as a "yes" or "no," and in other embodiments could be a code to indicate whether the risk is relevant to specific categories of requesters, such a government benefits program, a mortgage company, a creditor, or some other request category. It should be appreciated that some factors (e.g., recent patterns of transfers out) would be relevant to a request from a government benefits program, and the same factors may have little or no relevance to a mortgage company. In embodiments where the system has collected risk-related data (in addition to the risk marker itself), such data could be stored in a separate table of data (to be described later), and would only be accessed if the risk is relevant to the purpose of the request.

Figure 5:
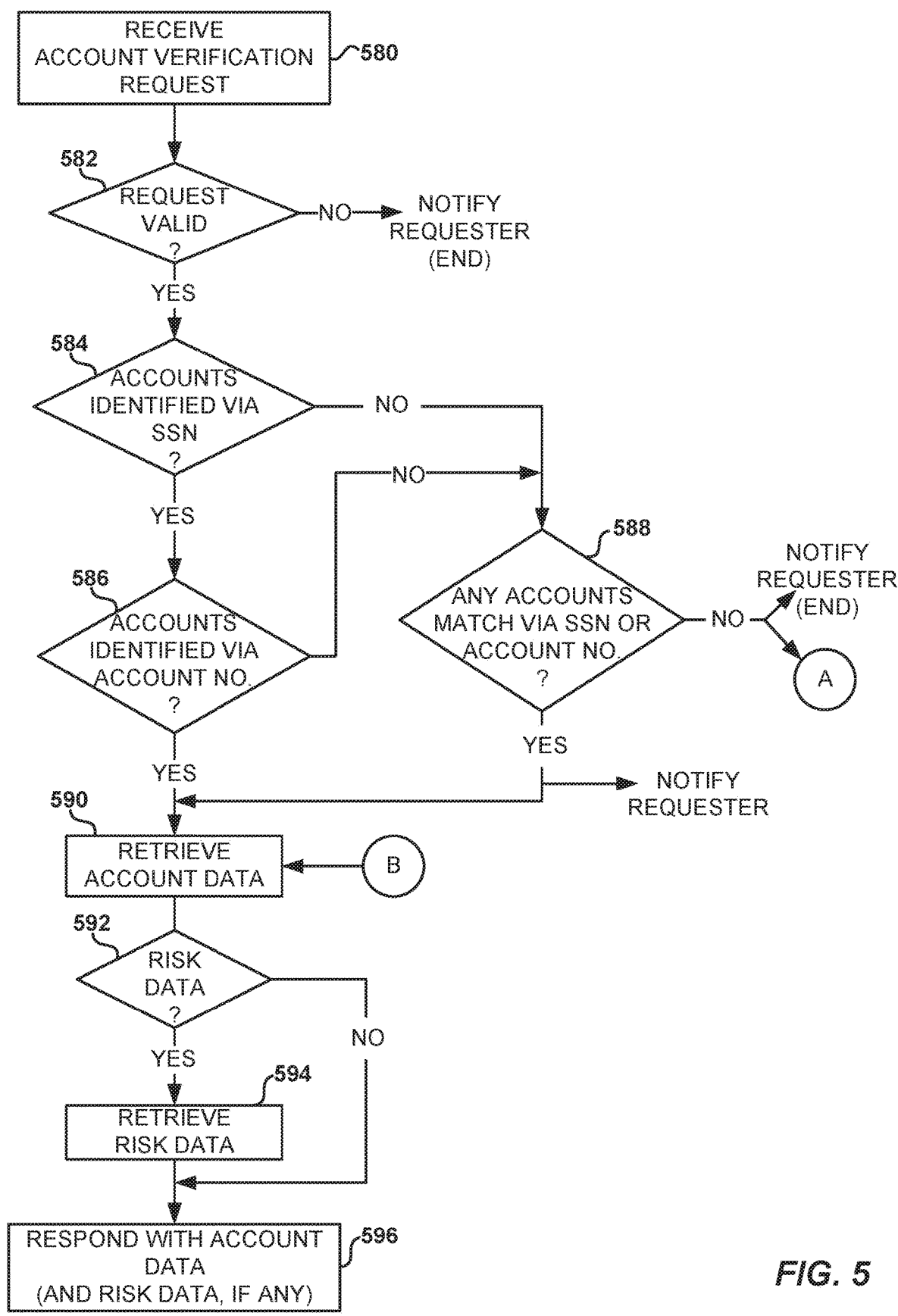

FIGS. 3, 4 and 5 illustrate processes for responding to requests received at the database system 110. Before proceeding with descriptions of such Figures, it should be noted that a request to the system 110 may have a standard format and include information pertinent to the person (for whom the account data is sought), such as account holder SSN, name, address, and bank name(s) and account numbers (if any). However, information needed to identify any accounts for the person could be minimal and, in one embodiment, might only be an SSN. For example, in the case of an account search request (e.g., by a government agency doing a search for accounts), the SSN may be the only identifier provided and used to locate accounts. Other relevant data can be provided, if desired, to provide more accuracy and confirm matches (name, address, and even bank account numbers—if supplied by the person), and generally more information will be returned and its accuracy improved when more personal information is provided. In the case of an account verification request (e.g., by a mortgage company wanting to verify balance information supplied by an applicant), account numbers would typically be provided (for redundancy) as identifiers in addition to an SSN, to make sure that any account identified by an applicant is considered in verifying account balances. But even in that example, the system 110 could process and return account information based on a social security number. However, with either type of request, it should be appreciated that in some embodiments the requester may only provide a social security number as an identifier, and information can be returned by system 100 based only on that identifier and not relying on account numbers or other data concerning the account holder.

Turning now to FIG. 3, a request for an account search (e.g., locating for a government agency any account at any institution belonging to a person that is the subject of the search) is received by system 110 (step 310). The system determines if the request is valid (step 312). Such a determination could be based on several possible factors, such as whether the requester is authorized (e.g., the requester has, in advance, been properly authorized as an entity or individual), whether the request has been properly formatted (e.g., a personal identifier, such as a provided SSN, has the correct number of digits or is recognized as a valid SSN), and whether the device transmitting the request is recognized (e.g., from previous transactions or has been authorized in advance by the requester). If the request is not valid, the requester is notified (and the request is not processed further). If the request is valid, the system next determines whether there is an account in the database system 110 that matches the provided personal identifier (step 314). If the personal identifier does not identify any account, the requester is notified and the process ends (as indicated in FIG. 3). Alternatively, other steps can be taken (point "A" in the drawings) to identify accounts without using a social security number (such steps will be described shortly in conjunction with FIG. 4).

If accounts are identified with the provided personal identifier, the system looks for matches with other data (if any) provided by the requester (step 320). For example, a name or address provided in the request is compared to the data stored in system 110 for the identified account, and if there is no match the requester is notified and the search may end (at least temporarily). Alternatively, the process could continue, but with the understanding that the account data may not be relevant to the person that is the subject of the request. If the data matches at step 320, then the data for the identified account is retrieved, step 322. If risk data is also to be provided (if available and requested, step 324), then the risk data is retrieved (step 326) and the retrieved data is provided to the requester as part of the response (step 330).

As mentioned above, in some cases, even if an account is not identified with a personal identifier such as an SSN (step 314), the system 110 can be programmed to locate accounts using other personal information of the person in question. This is illustrated in FIG. 4, where the system 100 first looks for other matches of personal information (e.g., names, addresses, phone numbers) (step 410), and if there is match (step 412), the system may also analyze the match to verify that the information is for same account holder (step 414). As an example, this last step can be based on the amount of information matched, so that with two or more pieces of personal information being the same (both name and address for an account are the same as the name and address in the request) a match is indicated. In this example, if there is there is no match, the system 100 notifies the requester and the search ends. As an additional step, the system 100 may also further review any account where a match is made and verified at steps 412 and 414, identify the personal identifier such as an SSN for that verified account, and then also identify any other accounts in the database (at any institution) having the same personal identifier as the verified account (step 416). This process then returns to the process in FIG. 3, with any retrieved data provided back to the requester.

FIG. 5 illustrates a process similar to that of FIG. 3, but rather than an account search request, this process is used to respond to an account verification request (e.g., from a mortgage company). An account verification request is received by the system 110 (step 580) and the system determines if the request is valid (step 582). The system then determines if any accounts stored in the system are identified by the provided personal identifier such as an SSN, step 584. Since many account verification requests will also include account numbers provided by an applicant, the system determines if any accounts are identified by provided account numbers (step 586). The accounts that are identified (either at step 584 or step 586) are retrieved (step 590).

The system notifies the requester as to the nature of the matches (step 588). If there is no match of any accounts (no match of either the personal identifier or the account number), the requester is so notified and the process may end with that notification at step 588 (as indicated in FIG. 5). Alternatively, additional steps can be taken (point "A" in the drawings) to identify accounts (such additional steps are shown in, and were earlier described in conjunction with, FIG. 4). If, at step 588, there has been a match of only one of the personal identifier or account number, the requester is so notified (as to what identifier or information resulted in the match) and the process continues to the earlier described step 590 (account data for the identified account is retrieved).

If risk data is also to be provided (if available and requested, step 592), then the risk data is retrieved (step 594) and the retrieved data is provided to the requester as part of the response (step 596).

While FIGS. 3, 4 and 5 illustrate the search or verification process ending when no accounts are identified or found within system 110 (e.g., at steps 314, 412, and 588), it should be appreciated that other methods could be employed to respond to a search or verification request, in the event of an account not being found within system 110. For example, in one embodiment, when a requester provides account numbers and one or more of those account numbers are not found in the system 110, the system 110 could be configured to forward those account numbers to the institution(s) where they are maintained (e.g., using an RTN or bank name provided with the request), and then to respond to the requestor with any information supplied directly by the institution. In some cases, information supplied directly by the financial institution may supplement the account data retrieved from database 120 and, in those cases, both the information from the financial institution and account data retrieved from database may be provided in a response to the requestor (e.g., at steps 330 and 596). The methods just described could be accomplished automatically (on a batched basis or in real-time) in response an account number not being found in system 110 or, alternatively, could be accomplished with the assistance of personnel involved in operating system 110. In yet another embodiment, the system 110 could be electronically linked to the systems at various financial institutions 140 and configured to remotely search account databases at those institutions, so that as the system 110 searches its own database 120 it could likewise search (simultaneously or otherwise) the databases of the linked financial institutions and combine any located data in a response to a requester.

In some embodiments risk-related data (e.g., a risk score) may be generated based on the account data provided to and stored database system 110. This is illustrated by the scoring model and process of FIG. 6, where the account data for any given account is provided to scoring logic 610. The scoring logic, which could be implemented within the database management system 130 or a separate processing system (not shown) within central account database system 110, may use a statistical or rules-based analysis (other forms of analysis, such as artificial neural networks, could also be used) to develop a score (examples of analysis used by scoring logic 610 will be given shortly). In some instances, the account data may not be sufficient to generate a score (e.g., the account has recently been opened, or there has been very little or no account activity). In such case, the account data may be stored in a hold account queue 612 until sufficient data is available. In other cases, where there is sufficient data, the account data and resulting risk score may be stored in a scored account queue 614, which includes a risk score table 620.

Figure 6:
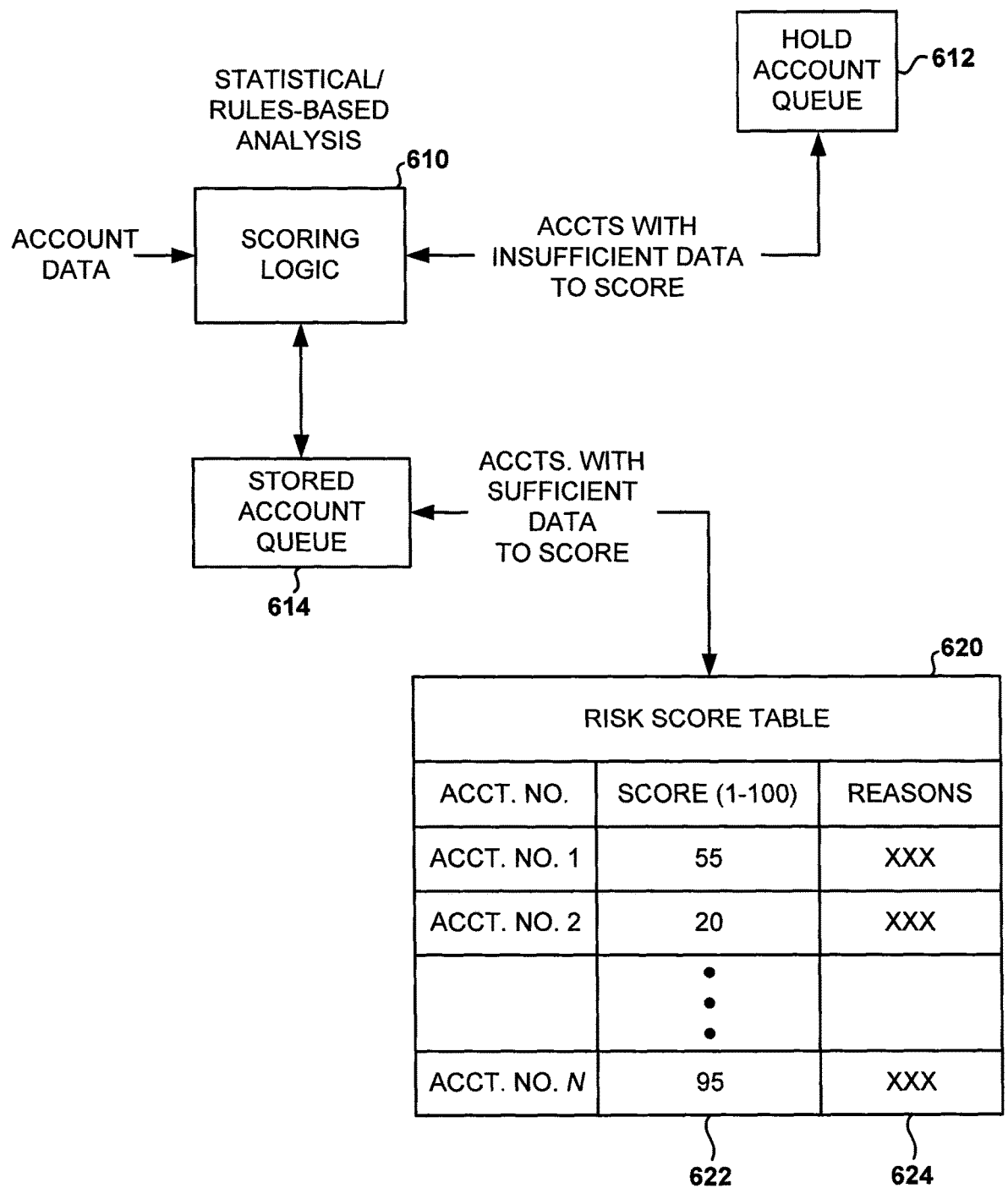
FIG. 6 is a block diagram of one suitable scoring model and process for use in one embodiment of the invention.

The process of FIG. 6 also illustrates that the scoring process may be continuous. As additional new account data arrives for any accounts represented in the hold account queue 612, the account data is reapplied to the scoring logic 610. The additional data is also used in association with already scored accounts in scored account queue 614 to make fresh calculations of risk data for those accounts. That is, the scoring logic 610 is periodically re-run using updated account data (along with previous data in the scored account queue 614), and the table 620 is updated with new scores as they are generated. Over time, most of the accounts represented in the hold account queue 612 should migrate to the scored account queue 614. Eventually, most active accounts will have risk scores in table 620.

In FIG. 6, risk scores 622 in table 620 are illustrated as numerical (from 1 to 100), with "100" representing the highest risk and "1" representing the lowest. Of course other, simpler forms of risk data could be generated, such as only three risk levels ("low," "medium," and "high"). Also, risk reasons 624 are illustrated in table 620. Such reasons (or codes for such reasons) could be based on risk factors described below.

The following tables illustrate scoring analysis (exemplary risk factors and corresponding risk impact) that could be used in scoring logic 610, for both an account search request (involving government benefits) and an asset verification request (involving a mortgage application). In one embodiment, the risk scores could be calculated by initially assigning a neutral score (e.g., 50), and then increasing or decreasing the initial score based on the risk impact identified in the tables. Also, individual risk factors could be weighted differently, e.g., depending on desires of the requester or based on experiential data collected by the operator of the system 110. Further, some risk factors require comparing account data to relevant data in separate, external databases (as an example, such databases might store names, addresses, email addresses, phone numbers and account numbers of suspected fraudsters). The system 110 would access those external databases as necessary in performing various risk analysis steps.

Risk Score Analysis
Account Search - Government Benefits

| Factors | Risk Impact |
| --- | --- |
| Transfer In/Out Patterns (money flow in and out of account) | Frequent deposits and withdrawals - increased risk (likely attempt to keep balances low) |
| | Infrequent transactions - decreased risk |
| Dates of Withdrawals (in relation to program requirements specifying a begin date for balances to be below program threshold amount) | Withdrawals within 6 months of begin date - increased risk (likely attempt to conceal assets) |
| | Withdrawals more than 6 months prior to begin date - decreased risk |
| Amount of Withdrawals (e.g. total withdrawals of $1000 during past 5 years) | At least one withdrawal - increased risk |
| | No withdrawals - decreased risk |
| Number/Nature of Located Accounts | 5 or more located accounts (likely attempt to spread assets) - increased risk |
| | Less than 5 located accounts - decreased risk |
| | Accounts located but not identified by beneficiary - increased risk |
| Names, addresses, phone numbers on account (in addition to those of beneficiary) | Matches with suspected fraudsters - increased risk |

-continued

Risk Score Analysis
Account Search - Government Benefits

| Factors | Risk Impact |
|---|---|
| Account SSN/Name Match | No matches with suspected fraudsters - decreased risk<br>SSN or name for account do not match those provided in request - increased risk<br>Both SSN and name for account match those provided in request - decreased risk |

Risk Score Analysis
Mortgage Application

| Factors | Risk Impact |
|---|---|
| Saving Pattern | Infrequent deposits during each month (not a likely consistent "saver") - increased risk<br>Frequent and consistent deposits - decreased risk |
| Added Signer | Signer address same as applicant - decreased risk<br>Signer address at zip code distant from applicant - increased risk<br>Name or SSN of new signer matches suspected fraudsters - increased risk<br>No matches with suspected fraudsters - decreased risk |
| Recent deposits | Large Amount(s) - increased risk<br>Small amount(s) - decreased risk |

Also, because the system 100 will likely store account information across most (if not all) financial institutions, additional data (not directly related to the account at hand) can be collected to provide additional forms of risk analysis. For example, if account data for an account is accessed and it reveals a large deposit (or a series of recent deposits that total a large amount), all other accounts in the system could be checked to see if a corresponding and identical withdrawal amount (or series of withdrawals) can be matched, thus linking another account (as a source account) to the account at hand. The system 110 could then check external databases to see if the source account is associated with a fraudster.

Embodiments of the invention also support other useful ways to tap the extensive and rich source of information maintained in the system 110. For example, the account data (including the risk scores) maintained in the system 110 may be used to assess creditworthiness. Not only could stored risk data be used in such an assessment, but loan or other credit accounts could be accessed (e.g., using only a SSN) to locate outstanding balances or credit limits (when stored in association with such accounts), and thus determine either the general creditworthiness of a person or entity (e.g., a person applying additional credit), but also verify representations made by an applicant in connection with the applicant's existing accounts.

As a further aspect of the present invention, a government or law enforcement agency may provide one or more personal identifier(s) corresponding to an individual or an entity named in a subpoena (or an instrument such as a National Security Letter or Writ of Execution) for financial or accounting records access, and the provided personal identifier(s) is/are used to determine which institutions, if any, have account or financial information for the individual or an entity named in the subpoena. If one or more of such institutions are found to have such account or financial information for the individual or an entity named in the subpoena, the names of the matching institutions are provided to the government or law enforcement agency with sufficient information (account number or identification information, for example) so that the subpoena may be efficiently served on the one or more matching institutions. If no matching institutions are found, indicia showing no match found may be returned to the government or law enforcement agency. As described more completely below, additional embodiments may perform analysis to provide additional information to the querying agency. The personal identifier for the individual or entity named in the subpoena may comprise any desired identification element, including, but not limited to, an SSN, a personal name, a mailing address, a physical address, the name of a corporate entity, a driver's license number, a prisoner number, an immigration number, a Matricula Consular number, or any other desired indicia. Further, personal identifiers may constitute a plurality of information designed to either narrow or broaden the search criteria depending on the desired result. Requiring more than one match for a plurality of provided identifiers might produce fewer results and would narrow the search. A match for any one of a plurality of provided identifiers might produce more results and would broaden the search.

For example, furnishing a plurality of personal identifiers such as an SSN and name and address (and requiring that an identified account have a match for each of the SSN, name and address) may further refine the search results and limit false positives, but depending on the amount of information returned, submissions of multiple identifiers, if a multiple match is required, could return too little information to be useful. Optionally, and to further refine results, the submitting agency may specify which of the submitted personal identifiers are required, and which may be optional, or which may be required in combination. For example, the submitting agency may specify that both a last name and an SSN must match the submission. In some embodiments, personal identifiers may comprise a list of related information for a suspect individual, for instance, a list of personal identifiers corresponding to known associates of the individual, and accounts of the known associates may be identified (along with the accounts of the suspect individual). Using additional analysis techniques, which may include link analysis or network analysis, account information corresponding to known associates and to others linked to the individual or entity identified in the subpoena may be returned to the submitting agency.

Figure 7:
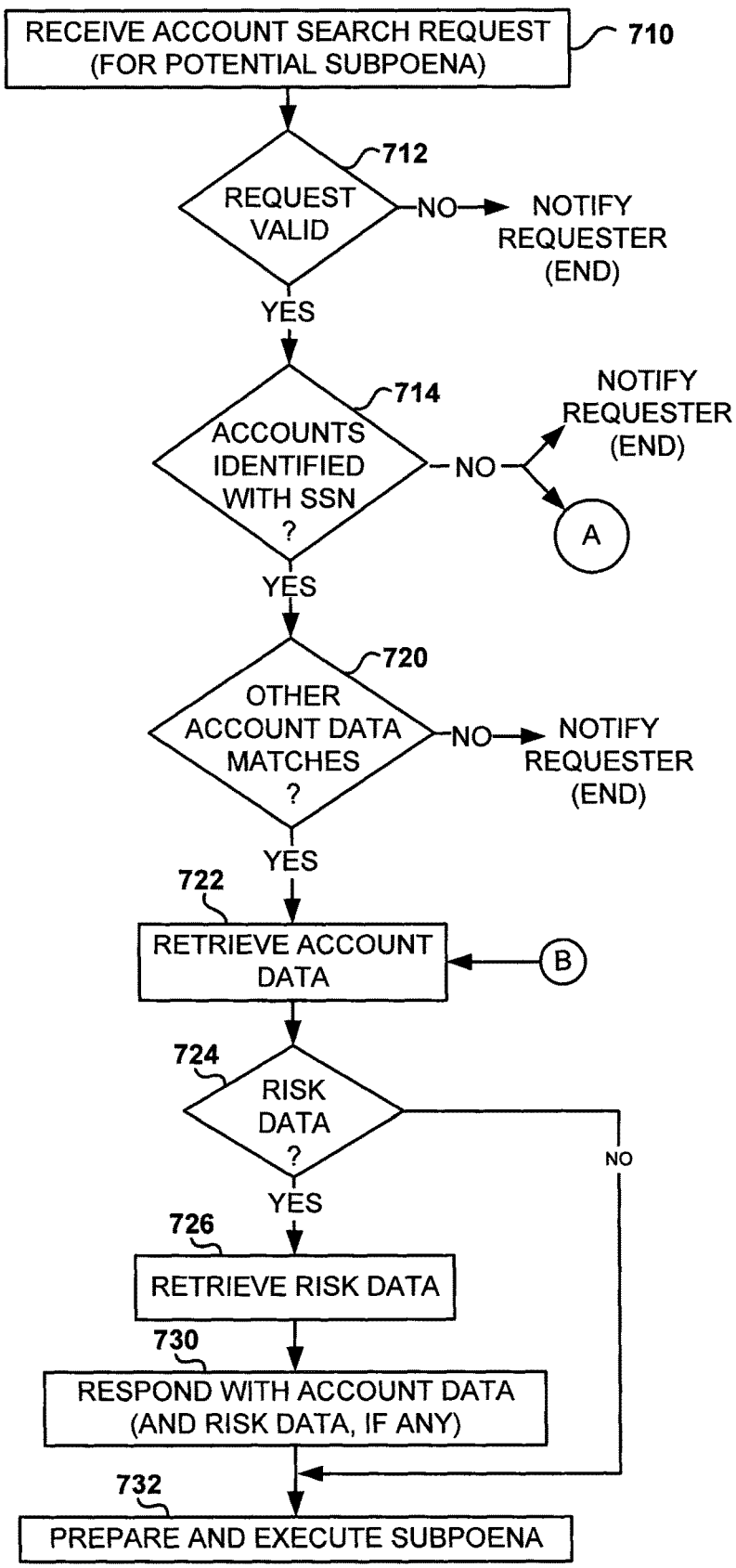
FIG. 7 is a flow diagram illustrating a process used within the database system of FIG. 1, in accordance with an alternative embodiment.

A simplified illustration of one such process is seen in FIG. 7. The process of FIG. 7 is similar to (and has steps corresponding to those of) of FIG. 3, but more specifically involves a search request (step 710) from a government agency for an individual or entity contemplated as the subject of a subpoena. As described in conjunction with FIG. 3, the system 110 determines whether the request is valid, step 712, and whether any accounts associated with a personal identifier of the subject (such as a social security number) can be identified, step 714. If there is no SSN match, then the requester is notified (and the process may end), but optionally, other steps can be undertaken to identify accounts without using a social security number (steps proceeding from point "A" in the drawings, using a process similar to that described earlier in conjunction with FIGS. 3 and 4). At step 720 other account data (e.g., name and address, if any, provided with the request) may be used to provide additional confirmation that the identified account is matched to the person that is the subject of the search. While not illustrated in FIG. 7, linking and network analysis can optionally be used to identify additional accounts and provide other information that may have some association with the subject of the contemplated subpoena, as will be described in connection with a specific example to follow shortly. Account data for any identified account is retrieved at step 722. As in FIG. 3, if risk data associated with an identified account is available (step 724), it may also be retrieved (step 726). Among other things, risk data may be used to determine the need for quickly executing a subpoena and then seizing an account that has a high risk of being involved in fraudulent activity (and that may be likely to have its balance quickly depleted/transferred by the fraudster/account holder). The retrieved data is provided (step 730), and a subpoena is prepared and executed at step 732 by the government agency.

As a specific example addressing an embodiment of the present invention, consider a hypothetical subpoena that is planned to be issued so that a law enforcement agency may find and obtain financial account information (and possibly related information) for an individual named Vito A. Corleone who has an SSN of 123-45-6789. Prior to embodiments of the present invention being available, difficulties immediately arise in trying to determine which financial institutions may have accounts for Vito Corleone; prior practices may have involved serving subpoenas or NSLs on a large number of financial institutions hoping that one or more of them have an account for Vito Corleone. In the process, much time and expense was wasted serving the subpoenas or NSLs to the institutions not having accounts for Vito, as well as the wasted time and expense borne by the financial accounts in responding to such "blind guess" subpoenas. However, in embodiments of the present invention, the law enforcement agencies may be provided indicia regarding which institutions have accounts related to Vito Corleone with a matching SSN, and optionally, account identifying information corresponding to accounts for which Vito is a signatory.

In a modification of the previous example, consider the case where no hits were found for Vito Corleone, with or without his SSN, at any institution's records stored in the database system (110) of the present invention. It may be likely that accounts may have been opened at various institutions by Vito's known associates to attempt to conceal Vito's financial transaction information. In an embodiment of the present invention, Vito's last known address was known by the submitting law enforcement agency (123 Genco Way, Long Island NY), and a list of known associates: P. Clemenza, S. Tessio, L. Brasi, D. Tommasino, and T. Hagen. A query could then be submitted to systems of the present invention to find accounts matching his address and any of his known associates, and such accounts may then be scrutinized to determine whether they are associated with Vito Corleone. Those of skill in the relevant arts also realize that other cross-matching information (for example Vito's middle name "Andolini") might be utilized with or without his SSN, and with or without other identifying information such as known associates. Further, through analyzing a network of Vito's associations created through linking and network analysis techniques as more completely described in U.S. Provisional Patent Application No. 61/448,156 filed Mar. 1, 2011 entitled, "System and Method for Suspect Entity Detection and Mitigation," the disclosure of which is hereby fully incorporated by reference for all purposes, ancillary information regarding Vito Corleone's social or financial transaction history may be analyzed to determine possible accounts that have some association with Vito. Types of ancillary information provided about Vito may include checking account records of any kind (bank statements, cancelled checks, etc.), loan information (loan applications, ledgers, etc.), savings account and securities records (certificates of deposit, investments, etc.), records of any safe deposit boxes at a bank, supporting financial documents (copies of tax returns, credit reports, etc.), current or present addresses associated with an account, hot files, accounts closed for cause, mobile or land line phone numbers associated with Vito or his present or prior addresses, and the like. Once a network has been constructed with Vito's identifying information, related accounts (or other information) and the institutions that host them, may be provided to the querying law enforcement agency.

Submissions of requests for subpoena/NSL account identification may be made by the requesting agency individually in a real-time, or in a single or grouped batch mode submittal that is executed at a predetermined time interval (for example, overnight). Additionally, further analysis could produce information that may be provided to the requesting government or law enforcement agency regarding identity information for other individual signatories on joint accounts that correspond to the individual or entity named in the subpoena; prior transactions indicating financial fraud related to the individual or entity named in the subpoena, and through network analysis, identifications of or risk indicia regarding any potential fraud rings associated with the individual or entity that is named in the subpoena. As such, additional related investigatory leads may be provided to the government or law enforcement agency as a result of social or transactional associations with other entities. In an additional aspect, the requesting agency (or an entity, broker, or processor acting on the agency's behalf), after determining which institutions possess information about the subject of the subpoena/NSL, may send to the relevant institutions a formatted request for information that allows the possessing institutions to "fill in the blanks" for any missing data that is pertinent to the subject of the subpoena/NSL, and the requesting entity/broker/processor may process the response on the institution's behalf directly to the law enforcement agency. In a further aspect of the present invention, the requesting government agency may specify to a processor/broker the relevant laws, statutes, rules, or orders under which it has acting authority to submit the subpoena/NSL, and the processor/broker pursues obtaining the information for the agency on its behalf. Further, the processor/broker may utilize the specified listing of laws, statutes, rules or orders furnished by the government agency to tailor the information request to one or more institutions that have been determined to possess information about the subject of the subpoena/NSL, and may optionally filter or redact any information that is received from the relevant institutions that is not permitted to be provided under a legal framework of identified statutes, laws, or rules.

Figure 8:
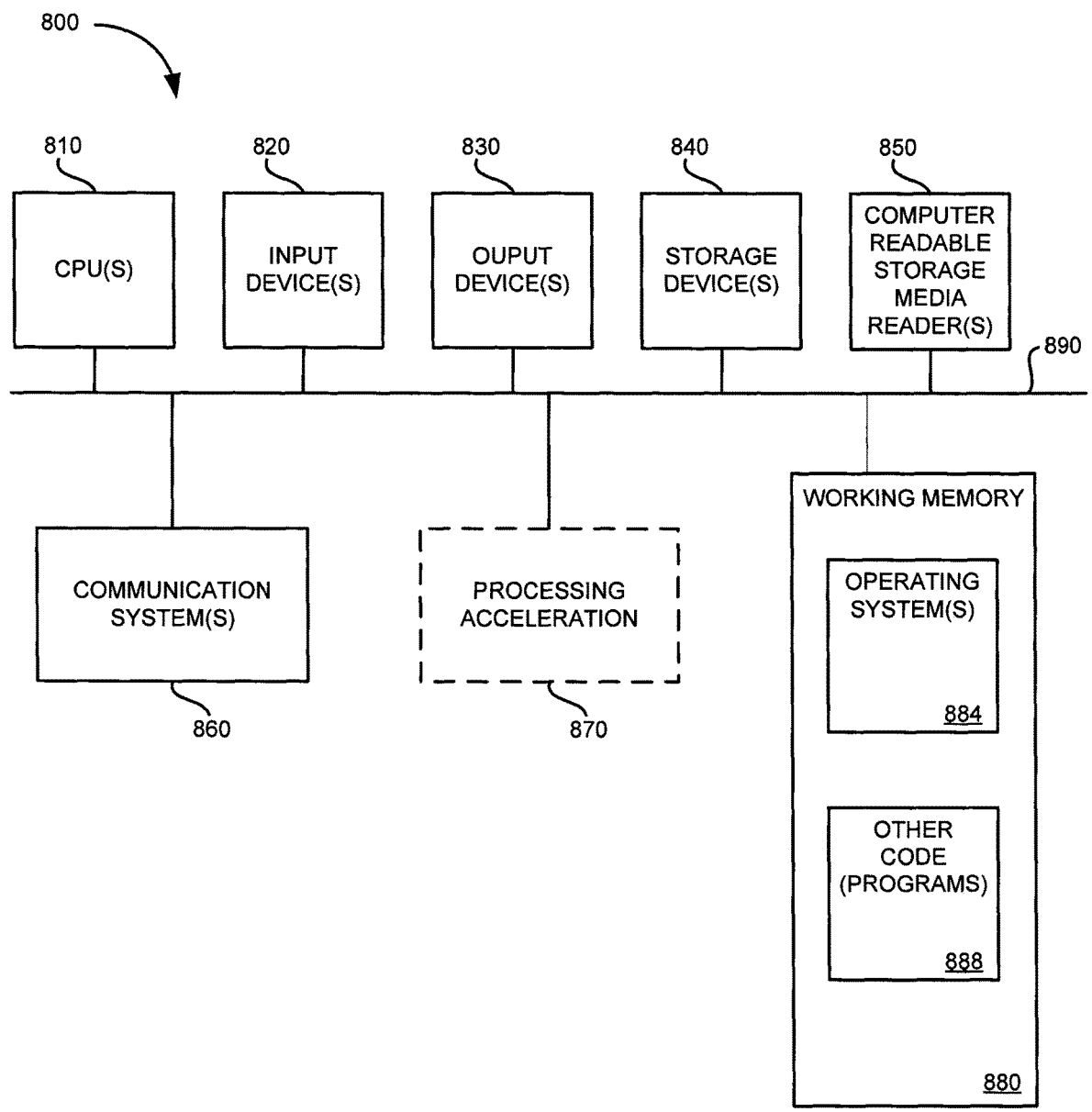
FIG. 8 is a block diagram of a computer system upon which various devices, systems, and processes described in conjunction with FIG. 1-7 may be implemented.

FIG. 8 is a block diagram illustrating an exemplary computer system upon which embodiments of the present invention may be implemented. This example illustrates a computer system 800 such as may be used, in whole, in part, or with various modifications, to provide the functions of the central database system 110, including the DBMS 130 and the scoring logic 610, as well as other components and functions of the invention described herein.

The computer system 800 is shown comprising hardware elements that may be electrically coupled via a bus 890. The hardware elements may include one or more central processing units 810, one or more input devices 820 (e.g., a mouse, a keyboard, etc.), and one or more output devices 830 (e.g., a display device, a printer, etc.). The computer system 800 may also include one or more storage devices 840, representing remote, local, fixed, and/or removable storage devices and storage media for temporarily and/or more permanently containing computer-readable information, and one or more storage media reader(s) 850 for accessing the storage device(s) 840. By way of example, storage device(s) 840 may be disk drives, optical storage devices, solid-state storage device such as a random access memory ("RAM") and/or a read-only memory ("ROM"), which can be programmable, flash-updateable or the like.

The computer system 800 may additionally include a communications system 860 (e.g., a modem, a network card—wireless or wired, an infra-red communication device, a Bluetooth™ device, a near field communications (NFC) device, a cellular communication device, etc.) The communications system 860 may permit data to be exchanged with a network, system, computer, mobile device and/or other component as described earlier. The system 800 also includes working memory 880, which may include RAM and ROM devices as described above. In some embodiments, the computer system 800 may also include a processing acceleration unit 870, which can include a digital signal processor, a special-purpose processor and/or the like.

The computer system 800 may also comprise software elements, shown as being located within a working memory 880, including an operating system 884 and/or other code 888. Software code 888 may be used for implementing functions of various elements of the architecture as described herein. For example, software stored on and/or executed by a computer system, such as system 800, can be used in implementing the processes seen in FIGS. 3-7.

It should be appreciated that alternative embodiments of a computer system 800 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

In other aspects, embodiments of the invention may be used in a context involving a third party, for example for quality control, auditing, or other purposes. In particular, embodiments of the invention may facilitate the securitization and secondary marketing of home mortgages by a government sponsored enterprise such as the Federal National Mortgage Association (FNMA) (also known as "Fannie Mae") or the Federal Home Loan Mortgage Corporation (FHLMC) (also known as "Freddie Mac").

Figure 9:
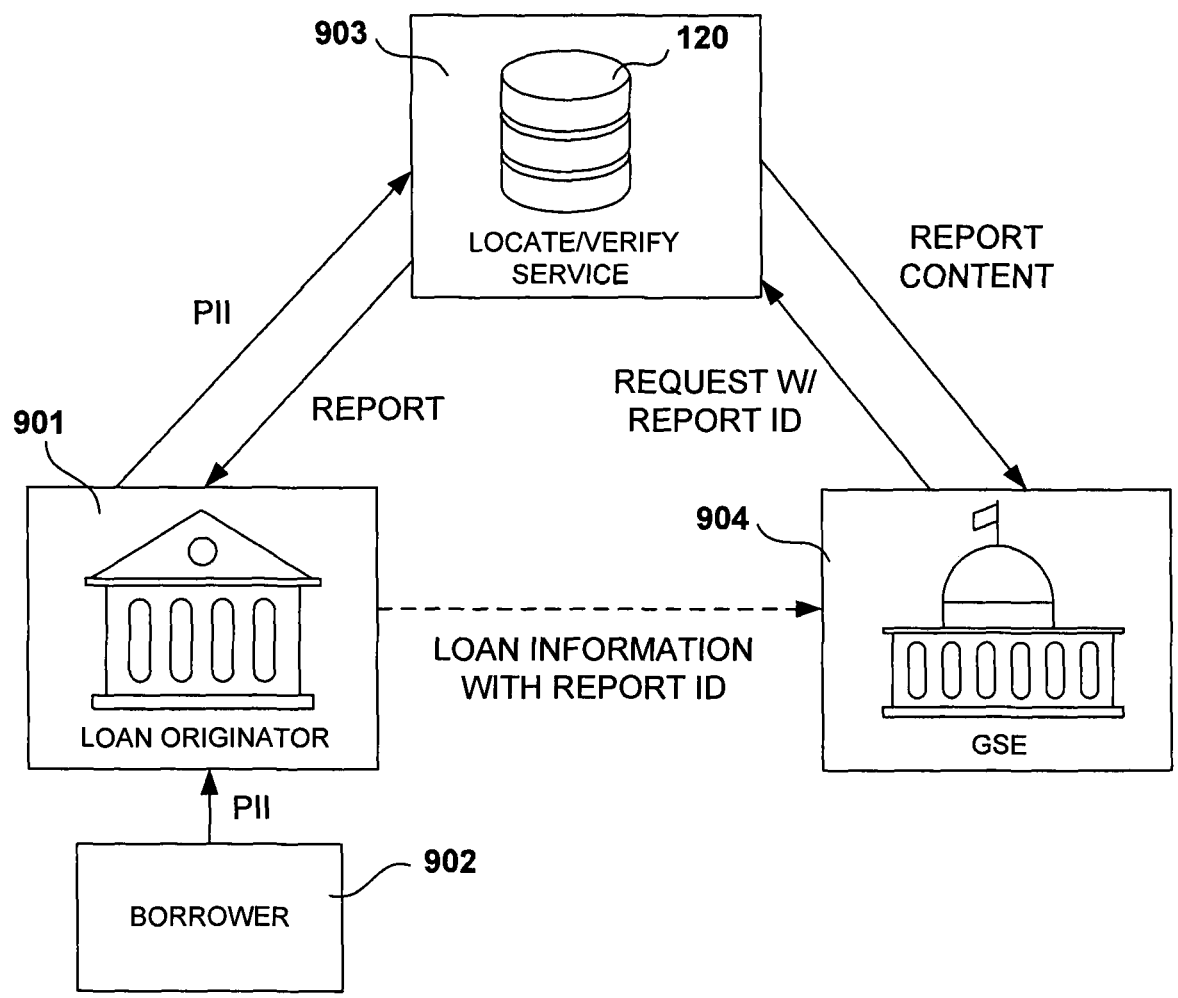
FIG. 9 illustrates relationships between various parties involved in a scenario in accordance with embodiments of the invention.

FIG. 9 illustrates relationships between various parties involved in such a scenario. In the example of FIG. 9, a loan originator 901 receives a mortgage application from a borrower 902. The application includes, among other information, personally identifying information (PII) identifying the borrower. The PII may be, for example, a social security number, a tax ID number, or another recognized piece of information identifying borrower 902. The mortgage application may also include statements of the borrower's assets and liabilities, income, expenses, and the like.

Loan originator 901 typically may make its decision as to whether to issue the loan based on the perceived risk of the proposed loan, in light of the financial situation of borrower 902. As such, loan originator 901 may wish to verify the statements made by borrower 902 in the application, to the extent possible.

For this purpose, loan originator 901 may provide the PII of borrower 902 to asset location/verification service provider 903. Provider 903 may utilize a database system such as database system 110 described above to automatically locate or verify assets of borrower 902, based on the received PII. For example, provider 903 may maintain account database 120 holding account records from a number of financial institutions 140. Provider 903 locates accounts associated with borrower 102, and returns a report of its findings to loan originator 901.

Provider 903 may use any one, any combination, or all of the techniques described above or other techniques in researching the financial status of borrower 902. For example, provider 903 may locate accounts owned by borrower 902 and report the current balances in those accounts, so that loan originator 901 can gain confidence that borrower 902 has correctly stated its financial condition. In addition, provider 903 may investigate transaction data involving accounts owned or associated with borrower 902, to infer other information about borrower 902.

For example, database 120 may include records of deposits and withdrawals from accounts owned by borrower 902. The deposit and withdrawal data may be investigated to look for patterns that appear to increase or decrease the risk of making a loan to borrower 902.

In some embodiments, provider 903 investigates the pattern of deposits made to accounts held by borrower 902, for example to see if the balances in one or more of the borrower's accounts are due to a consistent pattern of similarly-sized deposits, or whether one or more balances were achieved in part by one or a few large deposits made within a predetermined time period. The relative size of a deposit may be measured in any workable way, for example in relation to the average deposit made to an account, in relation to the average balance in the account, or in another way.

In one embodiment, the relative size of deposits may be evaluated according to one or both of the following formulas:

$$\text{relative deposit size} = \frac{\text{Current deposit amount}}{\text{Average deposit amount in past 90 days}} \qquad \text{a)}$$

$$\text{relative deposit size} = \frac{\text{Current deposit amount}}{\text{Average daily balance during past 90 days}} \qquad \text{b)}$$

In formula a) above, the amount each deposit into an account is compared with the average deposit amount made into the account during a particular time period. In the example above, the time period is the most recent 90 days, but other time periods may be used as well. The threshold for considering a deposit to be large may be selected as desired, for example by loan originator 901. In some embodiments, a deposit may be considered large if it is at least 1.5, 2, 3, 4, 5, 10, or another number of times the size of the average deposit to the account during the time period of interest.

In formula b) above, the amount of each deposit into an account is compared with average daily balance in the account during a particular time period, for example 90 days or another suitable time period. The threshold for considering a deposit to be large may be selected as desired. In some embodiments, a deposit may be considered large if it is at least 0.5, 0.75, 1, 1.5, 2, 3, 4, 5, 10, or another number of times the average daily balance in the account during the time period of interest.

In some embodiments, either or both of these formulas may be used. For example, a deposit may be considered large only if it is at least twice the size of the average deposit made in the past 90 days, and is at least twice the average daily balance in the account over the past 90 days. Other formulas or criteria for recognizing large deposits may be used as well, in addition to, instead of, or in combination with formulas a) and b) above.

The report prepared by provider 903 preferably includes information about the deposit history of borrower 902. If no large deposits into a particular account are found, then the balance in the account may be deemed to have been achieved at least in part by a consistent pattern of deposits.

Presuming that loan originator 901 decides to proceed with the loan, the loan is closed. Loan originator 901 informs government sponsored enterprise (GSE) 904 that the loan has been made, including an identifier of the report that loan originator 901 received from provider 903, although the report itself is not included. GSE 904 may be, for example, and entity such as Fannie Mae or Freddie Mac, which may buy and securitize the loan. That is, GSE 904 may sell securities backed by a portfolio of loans including the loan made to borrower 902.

In order to evaluate the quality of the loan portfolio, GSE 904 may wish to review the information that loan originator 901 used in deciding to make the loan. GSE 904 requests from provider 903 the information in the asset location report that provider 903 made to loan originator 901 before the loan was closed. Because loan originator 901 gave the report identifier to GSE 904, GSE 904 can simply request the report by its identifier from provider 903. And because GSE 904 receives the report information directly from provider 903, the report provides an independent check on the practices of loan originator 901. The request from GSE 904 may typically occur some time after the closing of the loan, for example several months or more.

Provider 903 may perform other kinds of analysis as well. For example, the records in database 120 preferably include records of all deposits into the accounts held by borrower 902 (and other persons). Provider 903 may recognize a sequence of regular deposits made into an account of borrower 902, and may recognize that the deposits in the sequence are likely payroll deposits. For example, a sequence of deposits of the same or nearly the same amount may occur weekly or semi-monthly. The presumption that the sequence represents payroll deposits may be strengthened if the deposits are made by direct deposit from an identifiable company or organization that would have employees.

From this recognized sequence of deposits, provider 903 may be able to infer that borrower 902 is employed, and may also be able to estimate the employment income of borrower 902. For example, the amount of the deposit sequence may be annualized and adjusted for the likely effect of payroll tax and benefit withholding, to arrive at an estimate of the annual income of borrower 902. The income estimate may be included in the report produced by provider 903.

And because database 120 preferably contains records from a number of accounts at a number of financial institutions, additional detail may be available enabling a more accurate estimate of the income of borrower 902. For example, if another sequence of equal-size deposits to another account is found occurring on the same days as the presumed payroll deposits, this may indicate automatically-withheld savings being deposited to a different account than the bulk of the paycheck of borrower 902. The savings deposits may be detected even if the savings account is at a different financial institution than the primary account of borrower 902. If such a savings stream is found, the income estimate for borrower 902 may be adjusted accordingly.

In some embodiments, database 120 may also include information identifying the source of ACH or other automated deposits into the accounts covered by database 120. This information, combined with the identification of presumed payroll deposits as described above, may enable provider 903 to identify a presumed employer of borrower 902, and the presumed employer identification may be include in the report produced by provider 903. If borrower 902 listed its employer in the loan application, then the analysis by provider 903 may serve as a verification of the borrower's indication.

Database 120 may further contain records of withdrawals from accounts located using the PII of borrower 902, and these withdrawal records may be analyzed for additional information. For example, provider 903 may be able to identify a regular sequence of recurring automated withdrawals in a fixed amount and occurring on the same day of each month. Provider 903 may identify such a sequence as likely mortgage or other housing payments, auto loan payments, or other fixed expenses.

Database 120 may further contain non-transaction information contributed from various sources that may reflect on the risk associated with a loan. For example, banks or other financial institutions may inform provider 903 of past instances of fraud or abusive activity involving particular persons or accounts. Other sources of negative contributed information may include public arrest records, news reports of financial crimes, fraudulent activity such as marketing of stolen identification information conducted on the "dark" web, and other sources. The report produced by provider 903 may list such negative contributed information, or may note the lack of any negative contributed information on file associated with a particular person. Because database 120 preferably includes information submitted by a number of financial institutions, negative contributed information from one financial institution may inform a loan approval decision being made by another institution.

In some embodiments, the account records in database 120 may indicate that certain located accounts are joint accounts. Provider 903 may include in the report it generates an indication of joint account ownership. The report may include estimates of employment and income for joint account holders as well, and may include any negative contributed information found relating to any joint account holders.

Figure 10:
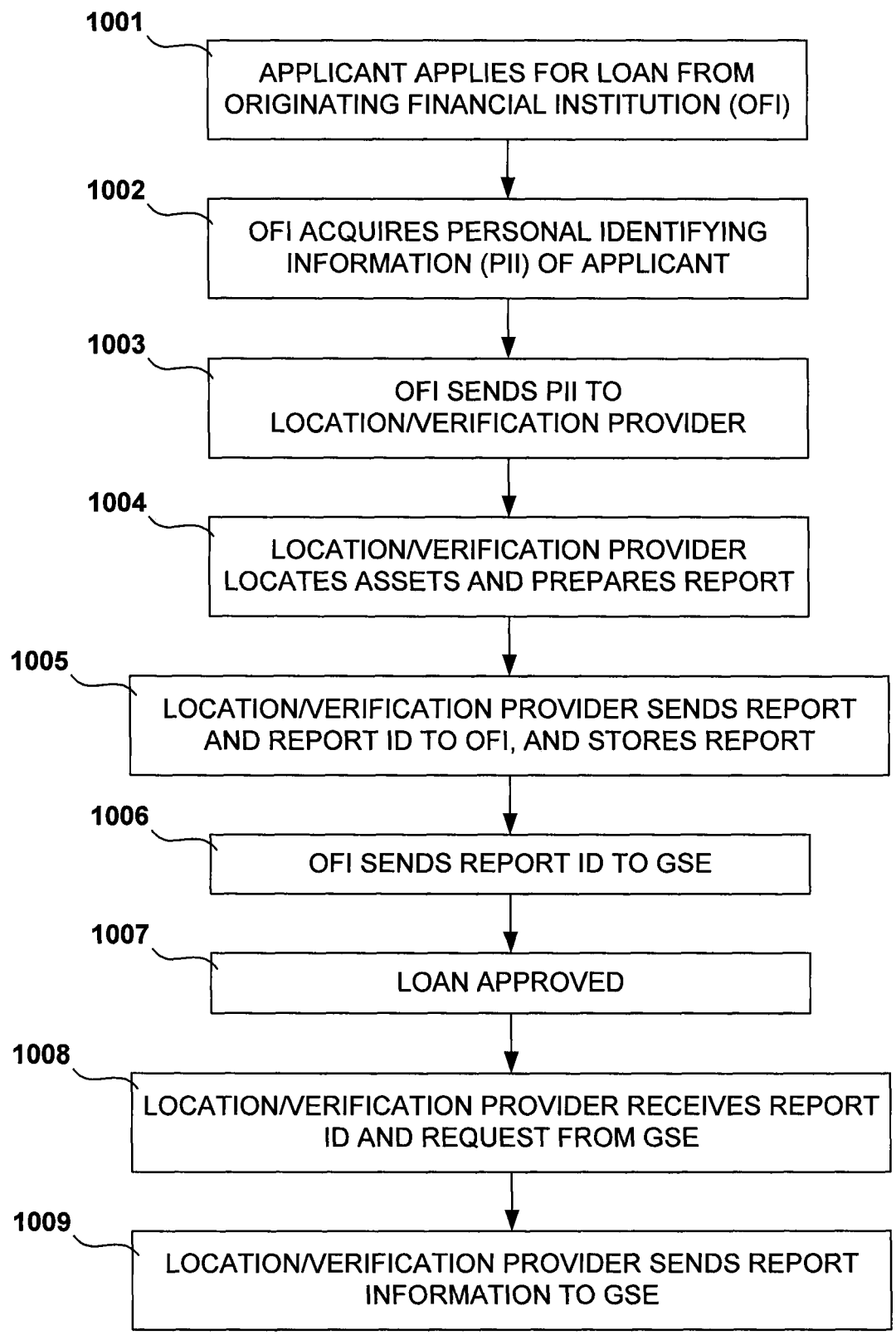
FIG. 10 is a flow diagram illustrating steps performed according to some embodiments of the invention.

FIG. 10 is a flow diagram illustrating steps performed according to some embodiments of the invention. In step 1001, an applicant, for example borrower 902, applies for a home mortgage from an originating financial institution (OFI) such as OFI 901. In step 1002, originating financial institution 901 obtains personal identifying information (PII) about the applicant. For example, the applicant may list a social security number or other identifying information in the mortgage application. In step 1003, originating financial institution 901 sends the personal identifying information about the applicant to an asset location/verification service provider such as provider 903. In step 1004, the location/verification provider locates assets of the applicant and may perform additional analyses of account data stored in a database such as database 120. Additional details of some embodiments of step 1004 are shown in FIG. 11.

In step 1005, the location/verification service provider sends the report and its identifier to the originating financial institution. The location/verification service provider also stores the report and its identifier for later access. In step 1006, the originating financial institution sends the report identifier to another party such as government sponsored enterprise (GSE) 904. The report itself is preferably not sent to the GSE or other party at this time. In step 1007, the loan is approved. (It is presumed for ease of explanation that the loan is approved. Of course, not all loans will be approved.) In addition, the loan may be sold to the GSE.

In step 1008, the location/verification service provider receives a request for the report information from the GSE or other party. The request includes the report identifier. In step 1009, the report information is communicated to the GSE or other party.

Figure 11:
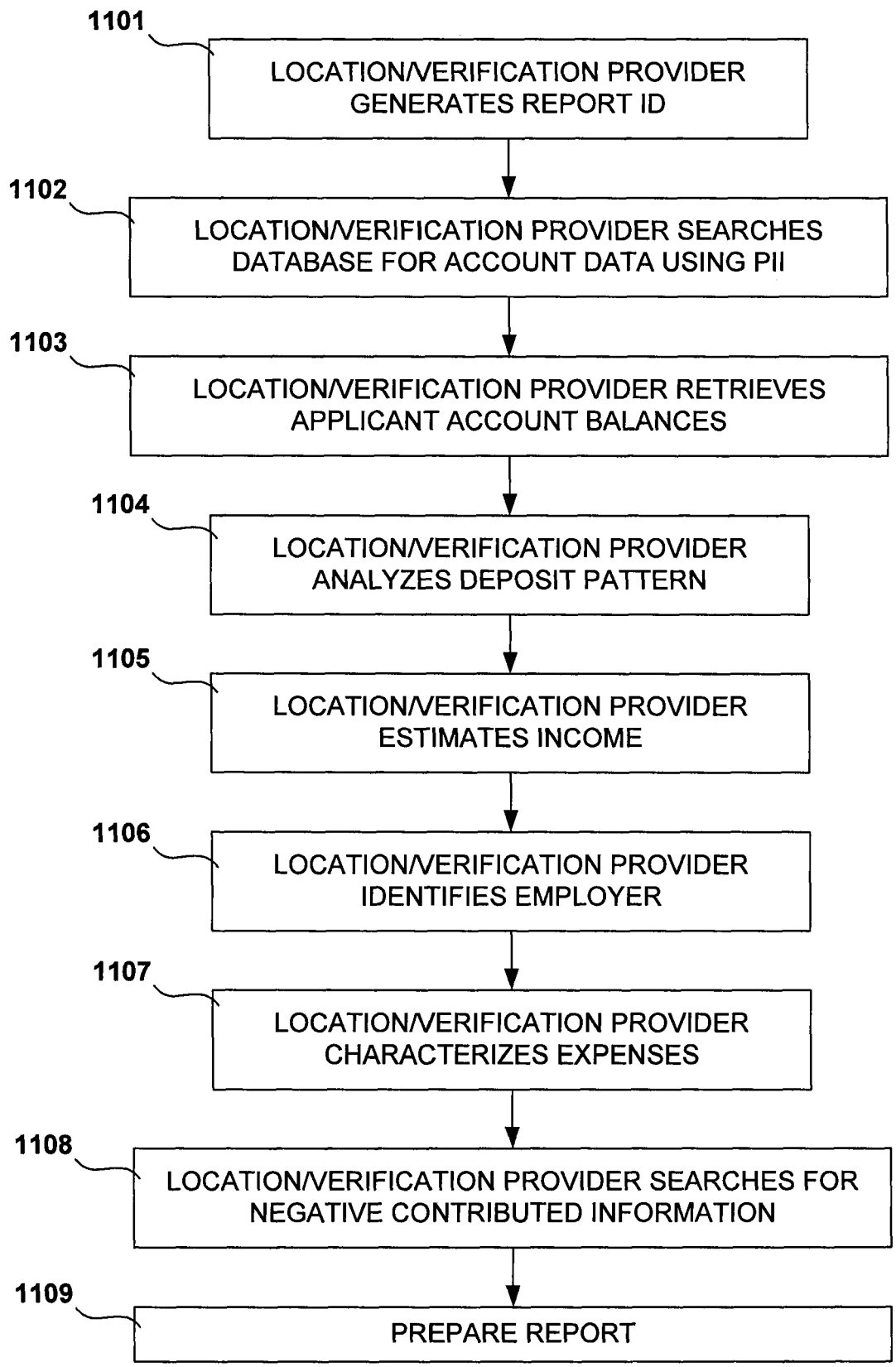
FIG. 11 is a flow diagram illustrating steps performed by a location/verification service provider, according to embodiments of the invention.

FIG. 11 is a flow diagram illustrating steps performed according to some embodiments by the location/verification service provider, for example within step 1004 of FIG. 10. In step 1101, provider 903 generates an identifier of the report to be prepared. In step 1102, provider 903 searches the database for accounts associated with the person identified by the personal identifying information received in the request, to locate accounts owned or otherwise associated with the identified person. In step 1103, account balances of the located accounts are retrieved. Other information may be received as well, including transaction data listing deposits and withdrawals flowing into and out of the accounts.

In step 1104, a pattern of deposits is analyzed, so that information about the deposit pattern can be included in the report if desired. In step 1105, provider 903 estimates the income of the identified person, based on the transaction data of the located accounts. In step 1106, provider 903 identifies a suspected employer of the identified person. In step 1107, provider 903 characterizes recurring expenses of the identified person, based on transaction data of the located accounts. In step 1108, provider 903 searches for negative contributed information about the identified person. In step 1109, the report is prepared.

The report may include any or all of the items retrieved, estimated, or deduced in steps 1102-1108. It will be recognized that not all embodiments may perform all of the steps of FIG. 11, and that different embodiments will produce reports with differing levels of detail. Other steps may be performed in some embodiments.

While embodiments of the invention have been described above in the context of securitization of home mortgages, in which a GSE requests during the securitization phase information from a report that was generated during the loan qualification phase, it will be recognized that other kinds of entities may request previously-prepared reports. For example, an auditor, an internal quality control department, or another kind of entity may request previously-prepared reports.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the central account database system 110 system may be implemented by a single system having one or more storage device and processing elements. As another example, the central account database system 110 system may be implemented by plural systems, with their respective functions distributed across different systems either in one location or across a plurality of linked locations.

Moreover, while the various flows and processes described herein (e.g., those illustrated in FIGS. 3-7, 10, and 11) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

Embodiments of the invention provide methods and systems for linking data that is received from a plurality of different data sources, and making the linked data available for evaluation, processing or analysis. The plurality of different data sources may include any desired number and type of databases that may enhance the prediction of risk factors such as the likelihood of fraud. The plurality of different data sources may comprise, for example but not by way of limitation, collections of databases from one or more financial service organizations including banks, lenders, mortgage origination companies, credit card companies, traveler's cheque companies, brokerage firms, short-term or payday loan companies, financial planners, investment firms, and the like; collections of databases from federal, state, or local government agencies; collections of databases from online sales or service providers; collections of data from lodging, rental, or apartment providers; collections of data from common carrier providers such as airline, train, or bus services; collections of data from insurers; collections of data from social networking organizations; collections of data from utility providers including wired or wireless telecommunications, cable, energy, water, sewerage, trash, and the like; and combinations thereof. Data to be linked is received as a plurality of data records, each having data fields or elements that relate to a data entity. An entity may be, for example, a person, organization, address, event, device, account, or transaction. In its broadest sense, an event may generally be any tangible or intangible object for which information may be collected. Systems and methods described herein analyze the data received, examine the data elements of the data records for common characteristics, establish and identify relationships or links between data records that have elements with common characteristics, identify, through a scoring algorithm, the riskiest networks in terms of likelihood of fraud, and then store the data and the links that have been established or identified. The linked data for an entity may be represented to a system analyst or a data user as a network of nodes (each node representing a data record or similar set of data), with the network of linked data nodes relating to that entity. As further described below, one or more additional entities of interest may be present in any linked network, and in various embodiments, related entities may be selectively presented or suppressed depending on the level of analysis needed, or depending on a predetermined threshold of risk associated with each entity to be included in the network. Such presentation or suppression may be performed manually or in an automated computer system by a system analyst, an expert system, an algorithmic approach, a set of heuristics, a fuzzy logic system, a neural network decision engine, or any other appropriate method.

As one example, if an entity is a person, then a network of data nodes may be established and stored for that person. There may be a personal data node or record that contains primary personal information for that person (e.g., name, social security number, home address, telephone number, driver's license number, date of birth, bank and credit card account numbers, etc.), with the data in that record having been either contributed by one data source or contributed by (and built from) multiple data sources. Other nodes in the network contain data records that have been directly or indirectly linked to that person. For example, a second linked node in the network may be a data record relating to the home address of the person of interest (optionally containing detailed information about the home address, such as the type of building, names of other known occupants, all phone numbers associated with that address, names of prior owners/occupants, existence and amounts of mortgages/liens, and so forth). A third linked node may contain a data record for a mobile or fixed phone number of the person, such as the listed phone subscriber's full name, an address associated with the phone number, bill payment history associated with the phone number account, etc.). In addition to nodes that have been directly linked to the person in question, other nodes in the network may be linked indirectly. For example, if there is a second person that is an occupant at the home address, or a second person shown as an account holder on a bank account of the primary person of interest, a data record containing that second person's personal information may be linked as a node, and also any other data records relating to or linked to that second person.

Figure 12:
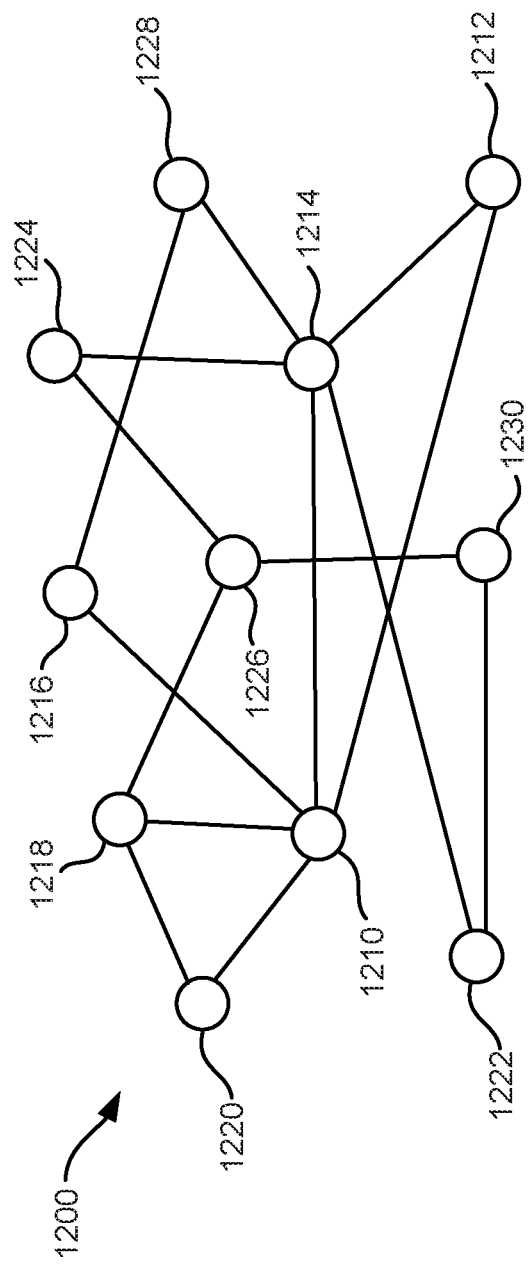
FIG. 12 is a diagram illustrating a network of data nodes, linked together in accordance with methods and systems of the invention.

The forgoing is diagrammatically illustrated in simplified form in FIG. 12. As seen, a network 1200 has a plurality of data nodes 1210, 1212, 1214, 1216, 1218, 1220, 1220, 1222, 1226, 1228, 1230. The network 1200 is associated with a single entity, such as a person. In such case, and using the example just given, node 1210 may represent a data record of the primary personal information for that person, node 1212 may represent a data record for the home address of the person, node 1214 may represent a data record corresponding to the phone number of the person, and so forth. Carrying the example further, other directly linked nodes (1216, 1218, 1220) may represent data records associated with the person's driver's license number (e.g., personal information and traffic records), bank or credit card account number (e.g., balances, transaction history, fraudulent activity, returned checks, missed payments, etc.), social security number (e.g., names or variations in names associated with that social security number, if any), and a personal data node having personal information of an identically or very similarly named person (and is thus likely to be the same person). As an example, personal information for "John A. Smith" might be linked when the network of nodes is for a person named "John Andrew Smith." It should be appreciated that these are only a few of many possible examples of data records or nodes that could be directly linked in a network to a primary personal data node.

Also shown in FIG. 12 are nodes 1222, 1224, 1226, 1228, 1230 which are indirectly linked to the primary node 1210. In the example given earlier, these could be data records not directly related to the primary person of interest but rather may be personal information for a co-occupant of a primary residence address or a co-owner of a bank or credit card account. These other nodes could be more than one level removed from the primary person of interest. As an example, a linked node could be a personal data record for a person that has no direct relationship to the primary person, but perhaps does have a relationship or link to a person that is shown as co-owner of a bank account with the primary person of interest.

Many other indirect links are possible, with each level of linkage being further removed from the primary person/entity. As will be more fully described later, in the analysis of data for linkage, consideration can be given to the likelihood of data being related, especially in the context of risk assessment and scoring. The levels of linkage and likelihood of data being related (and hence the size of the network 1200) can be adjusted depending on the use being made of the data, and the degree of risk tolerance (or, more generally, the desired confidence that the data may be related) of the entity or institution using the data. As should be appreciated, any data node (relating to an entity) may be part of (through a direct or indirect link) to many different data networks (relating to many different entities).

Generally, embodiments of the invention permit data (once it has been linked) to be accessed using an identifier for an entity, for example, an identifier associated with a person conducting a transaction. The identifier is provided to a system managing the linked data, and all linked data nodes in the network associated with the entity can be retrieved. In some cases, the linked data may be provided for data users themselves to assess risk associated with the data. That is, a data user might examine the linked data nodes (and the data represented by each node) and determine, for example, the impact of the data on a decision being made, such as deciding the risk associated with a transaction. In other cases, the linked data is analyzed in advance for risk, and a risk score (either alone or in combination with the linked data) may be provided for making a decision, such as assessing a transaction. Multiple uses may be made of the linked network, for example, but not limited to, identification of suspect entities via their relation with suspicious data records, whereupon an institution such as a financial service organization may take an actions such as determining that an account opened by the suspect entity should be frozen or closed to prevent fraud. In another application, an identified network related to a suspect entity may be utilized to detect potential bust-out fraud, where in one scenario, a fraudster makes a payment on a credit card account with an instrument that will not ultimately clear, and as the issuing bank makes available the appropriate credit balance, the fraudster makes charges against the newly-available balance. In yet another application, casinos or gambling organizations may analyze potential fraudsters who may be attempting to open markers or obtain casino credit with intent to defraud the casino or otherwise engage in money laundering activities. In another application, the network associated with the suspect entity may be used to analyze the potential risk that a transaction being performed by the suspect entity may result in fraud. In yet another application, the network associated with the suspect entity may be analyzed to determine the likely existence of a terrorist cell or a money laundering network.

In one embodiment to be described shortly, a financial institution might use the linked data to assess the risk associated with the financial transaction, such as the deposit of a check, an electronic debit transaction at a POS terminal, an ATM withdrawal, or a transfer of funds between accounts. Unlike many current systems that provide risk assessment based only on one or a few data files stored in association with an account (having information such as past returned checks, account status, or records of past fraud associated with the account), systems and methods of the invention permit an assessment that is based on a much deeper and broader examination of data, i.e., not only data pertaining to the account in question, but also data on parties involved in the transaction, and any records (from many sources, for example, multiple financial service organizations) that may be directly or indirectly related/linked to the transaction, to the account, to any parties involved, or to any other entity that is related or linked to the transaction.

As a more specific, simple example, a financial service organization assessing a check presented for deposit might supply a record of the transaction to the system having stored and linked data nodes. The transaction data might include the name of the payer and the account number of account against which the check is drawn. Such transaction data (provided as one or more identifiers) could be input to the system. For example, in response to the name of a payer (as an identifier), a network of data nodes representing linked data associated (directly or indirectly) to the payer on the check is provided (the linked data could be data records stored in association with the name of the payer or any co-owner of an account with the payer, in association with the address for the payer, in association with the social security number of the payer, and so forth). As mentioned earlier, the data provided in response to the identifier could be the linked data, or a risk score that has been assigned based on the linked data, or a combination thereof. Some specific applications where the systems and methods herein might be used are described in U.S. Pat. No. 7,383,227, issued on Jun. 3, 2008, to Laura Weinflash, et al., in U.S. application Ser. No. 12/126,474, filed May 23, 2008, by Laura Weinflash et al., and in U.S. Application No. 61/422,861, filed Dec. 14, 2010, by Laura Weinflash, the complete disclosures of which are incorporated herein by reference for all purposes.

It should be appreciated that the present invention is not limited to assessing data for financial transactions as just described. Many other applications and uses are possible. As examples only, networks of linked data nodes could be used for locating people, properties and assets, confirming identities, conducting background and criminal checks, conducting anti-terrorism investigations, monitoring chat room/social network activity, conducting competitive analysis, investment analysis, transportation route analysis, intellectual capital harvesting, or computer network analysis, and planning or operating manufacturing plants.

As just one example in connection with a manufacturing plant, a component or device in the plant could be an entity having an associated network of linked data nodes. The data nodes could include data records based on the name of the source/manufacturer of the component, the address of the source, financial accounts associated with the source, maintenance records (across many different facilities) for the component, court/legal actions involving the component/manufacturer, other products/components made by the same manufacturer, distributors and other users of the component, etc. Analysis of the data nodes in such an example could include assessing or forecasting malfunctions, defects, and life cycle issues associated with the component, or forecasting the effectiveness or interaction of the component with other components within the plant.

Figure 13:
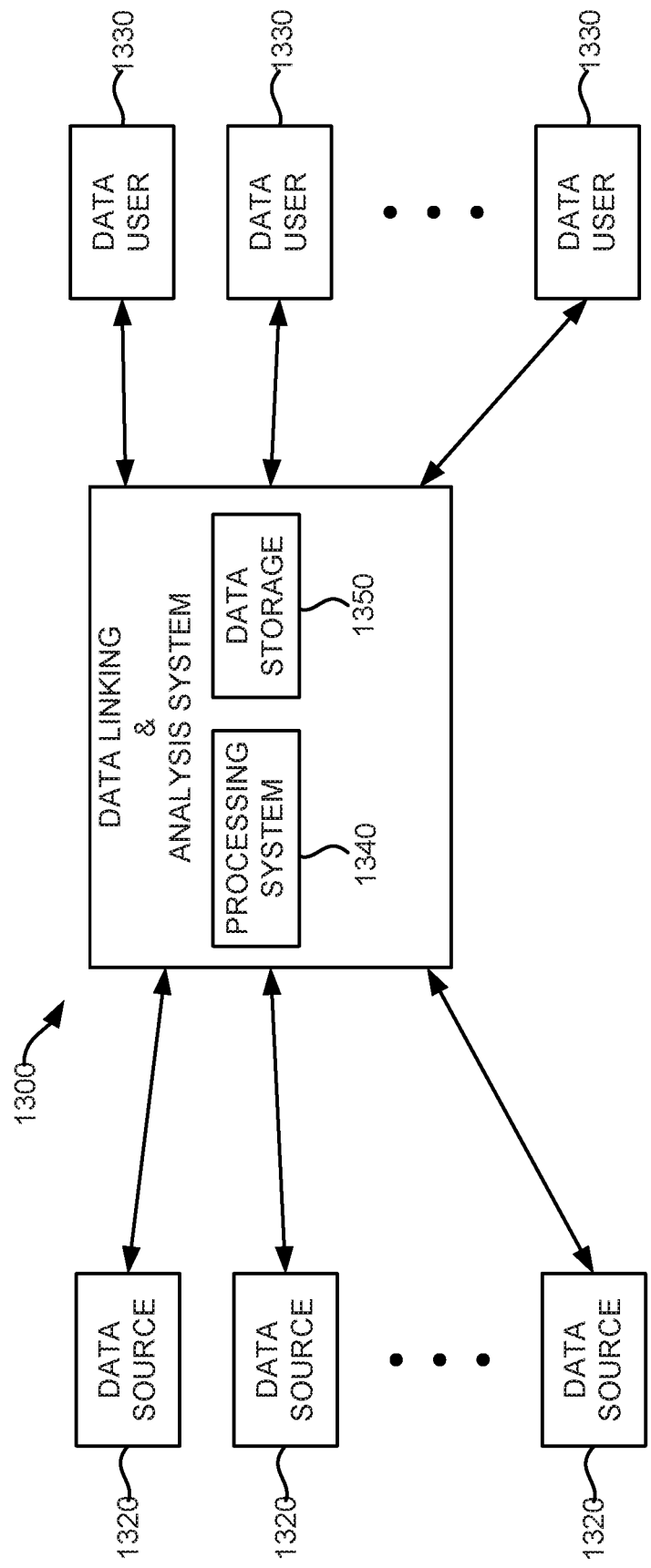
FIG. 13 is a block diagram of a system for analyzing and linking data received from a plurality of data sources in accordance with one embodiment of the invention.

Turning to FIG. 13, there is illustrated a data analysis and linking system 1300 in accordance with one embodiment of the invention. In an exemplary environment to be described herein, the system 1300 is used by financial institutions to assess financial transactions, and so the system 1300 receives data from a plurality of data sources 1320 that may have information useful in assessing financial transactions. Linked data stored at the system 1300 (such as the network of nodes generally illustrated in FIG. 12) may be provided upon request to any one of a plurality of data users 1330 (individuals or organizations) associated with client financial institutions.

The data sources 1320 may be large in number and varied in nature. In the case of financial transactions, the contributed data could include the following received from a variety of financial service organizations (e.g., banks, credit card companies, brokerage firms, lenders, mortgage origination companies, traveler's cheque companies, short-term or payday loan companies, financial planners, investment firms, and the like):

New account applications/inquiries
Applications to increase credit limits
Hot files (e.g., serious fraud activities reported to authorities)
Shared fraud records (e.g., records on lower level fraud shared among institutions)
Account abuse records (e.g., as maintained by individual financial institutions)
Account status records (e.g., from individual financial institutions maintaining accounts)
Account verification files (e.g., compiled from check/transaction verification services)
Address changes
Checking/DDA account transaction records (e.g., TIFs—Transaction Item Files)
Returned check records (e.g., RIDs Return Item Data files)
Check responses
Account owner files (personal data files for account owners, e.g., as maintained by individual financial institutions)
Appendix A attached hereto has a more detailed listing of specific financial/personal data that could be contributed by a financial institution in connection with one of its financial accounts.

The contributed data could also include the following received from non-financial institutions:
Death records (from Social Security Administration)
Records of cell phone and landline numbers assigned by telecommunications companies
Suspicious mailing address records from U.S. Postal Service
Motor vehicle records (from State agencies)
Driver's license records (from State agencies)
Real estate property records (mortgages, deeds, liens, etc.)
Corporate/business filing records
UCC filings
Court filings Telephone directory records
Social network and website data As seen in FIG. 13, the system 1300 includes a processing system 1340 for processing the data received from the data sources 1320 and, more specifically, for performing an ETL (extract, transform and load) operation in order to analyze and process the data for inclusion in a working internal data structure. The processing system further links, analyzes, and scores networks for subsequent analysis by systems analysts or data users. The system 1300 also includes a database or data storage system 1350 for storing, among other things, (1) data received from the data sources 1320 and (2) data defining data nodes and the links or relationships (sometimes referred to as "edges") that have been found between the data nodes. More specifically, the storage device 1350 stores data as it is received (in unprocessed form), retains in at least some cases that data for historical purposes, and holds that data for processing at the processing system 1340. The storage device 1350 also stores linked data nodes (and their linking relationships) that result from linking analysis done on data at the processing system 1340.

To manage the stored data nodes (and linking relationships), the storage device could implement matrix-type data arrangements (reflecting data nodes and their relationships to each other). To minimize the required storage space, a sparse array or mesh data structure could be used, reducing the need to utilize storage space for non-zero data elements of the stored matrices. Matrix operations and linear algebra techniques may be accordingly utilized to analyze risks, determine risk networks, and assign scores. As matrix-type operations are often more computationally efficient than linked data structures, improvements in processing efficiency may be accordingly obtained through this approach.

Figure 14:
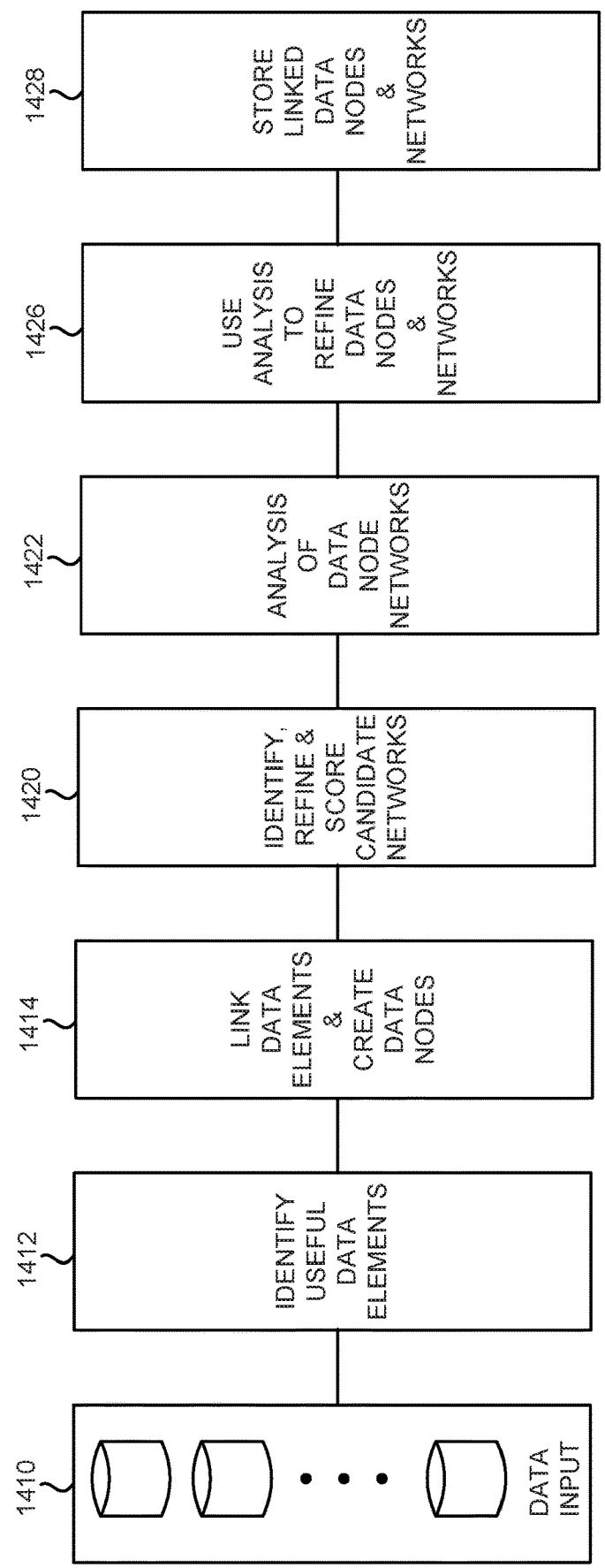
FIG. 14 is a flow diagram of a process for analyzing and linking data using the system of FIG. 13.
Figure 14A:
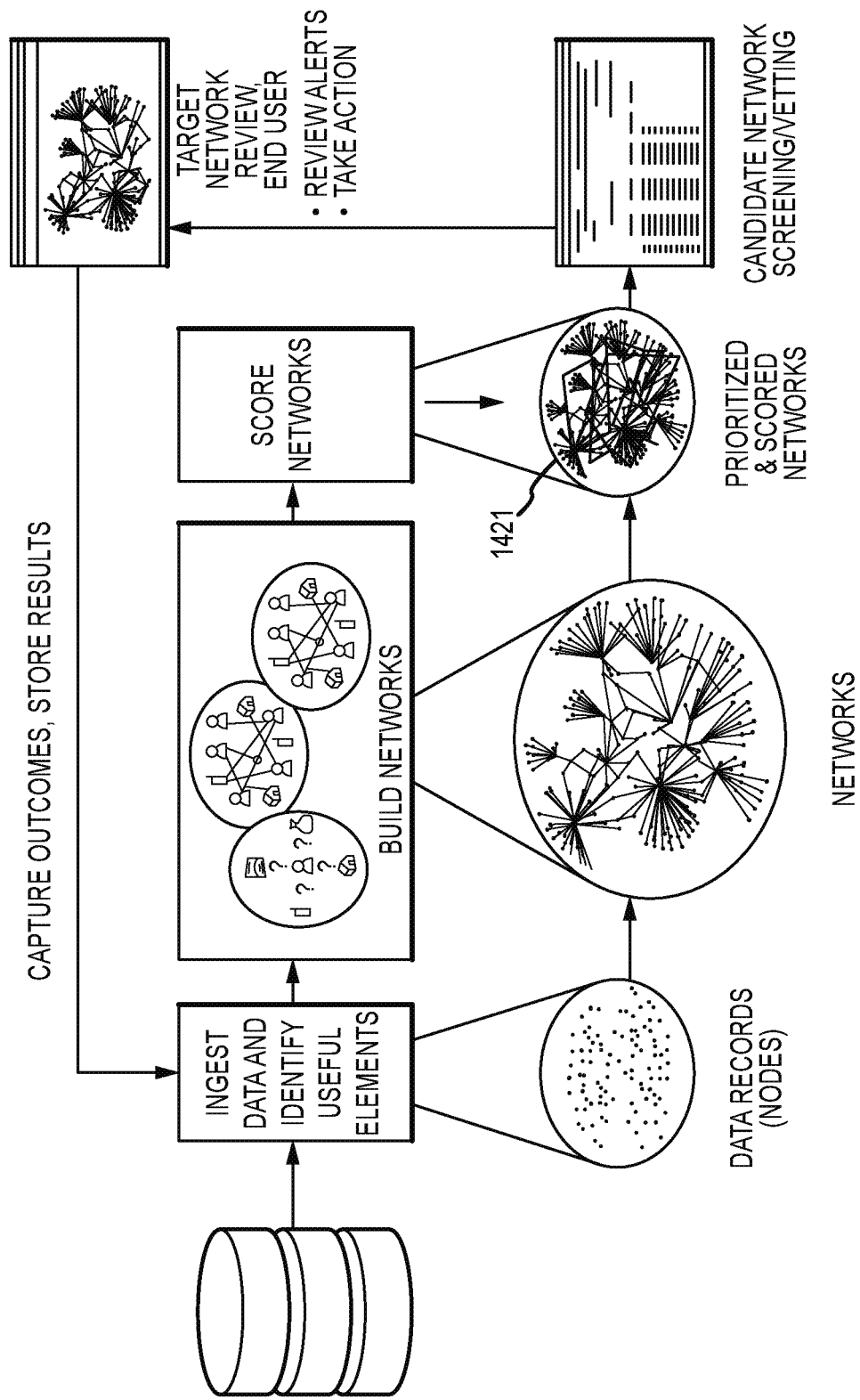
FIG. 14A is another flow diagram of a process for analyzing and linking data using the system of FIG. 13, illustrating the process in an alternate depiction.

FIGS. 14 and 14A illustrate a basic process for creating data nodes (based on data received from data sources 1320) and for linking those nodes for subsequent access/use by data users 1330. Initially, data is input to system 1300 from the data sources 1320, as represented by step 1410. The inputting of data may be in batch mode (e.g., at periodic intervals, such as once per day, per week, per month, etc.) or could be done on a real-time basis as data becomes available from the data sources 1320. As mentioned above, ETL processing of the data may occur to prepare the data for inclusion in the system database (FIG. 13, 1350). The data (whether received in batch form or in real-time) is stored in storage device (FIG. 13, 1350) for initial analysis at step 1412.

At step 1412 each data record is parsed to identify useful elements in the records. A useful element is a component or data field that potentially could be used to identify an entity or characteristics of an entity, and thereby link one record (relating to an entity) to another record (that might also relate is some way to that entity). For example, if a personal account information record is received from a bank, each field in the record is reviewed to determine if it would be useful to the linking process. In the case of a personal information record, useful elements would typically be name, address, social security number (SSN), account number, phone number, etc. Other data elements in a data record that might not be as useful are comments appended to the account or similar information which would be difficult to link to other records. Such less useful data elements might be kept in a historical archive within storage device 1350, but discarded for purposes of creating a data node. The process just described at step 1412 would be iterative, i.e., repeated for all (or a large number) of the data records being analyzed before progressing to the next step or phase of the process.

At step 1414, data elements from different records are linked using the elements identified at step 1412. This step is carried out by comparing elements from different data records, and if the compared elements from different records share a certain degree of closeness, similarity, relatedness or commonality, they are linked (at least initially) to each other. It should be appreciated that the degree of "closeness" that would result in a link could be established in advance by the design of the system, such as by parameters input or programmed into the system. In some cases, exactness or near exactness might be expected or required. As an example, in comparing a numerical identifier (e.g., a social security number) from different records, the system might only link the records if the identifiers are identical with respect to every digit. In other instances, if the identifiers are only different by one digit, they might be linked (e.g., to take into account a slight difference that might have been the result of an inadvertent data entry error, or in some cases, the result of a deliberate attempt by a person to conceal a relationship). The same analysis could be used with names, so that only identical names (or names with a single letter being different) are linked. It should be appreciated that, as additional elements of the records are compared, additional matches of data elements (or a failure to find additional matches) may result in initial links being either confirmed or removed. For example, if one element for each of two records are nearly identical, and then a second corresponding element for the two different records is found to be identical or nearly identical, the link between the two records might be confirmed. In other cases, where the second corresponding element is much different, the link might be discarded or removed. Obviously the examination and comparison of elements for creating a link between two records can be implemented using various techniques, such as statistical, probabilistic and other predictive methodologies. Such methodologies could be based, e.g., on predetermined rules, on empirical or experiential data, or using neural networks. In some cases, two records may be found to contain the same data (e.g., personal data files for the same person from two different sources), and such a record could be discarded as redundant since it would not be useful as a separate data node.

Also, in some embodiments, the link analysis at step 1414 may be performed and refined through several progressive stages. At a first stage, elements from a group of records that have any degree of similarity (even at a low level) are initially linked. At a second stage, the same group of records is then re-examined for "hard links," having data elements easily matched with some degree of certainty (such as having an identical SSN or other unambiguous identifier). If there are records with hard links, those records are confirmed as linked. Any remaining records in the group (without hard links) are then re-examined at a third stage with more sophisticated logic for determining less straightforward relationships or "soft links." As an example, in this third stage, two different names (such as aliases) are linked to each other by determining that they each have one or more common links to a third piece of information or to a third party, such as a common relative, e.g., based on addresses, ages, and parent/child relationships. Also, it may be determined that individuals with similar or identical names are in fact not the same person, but may be related, such as a parent/child, and they are linked for that reason. These are only a few of many possible examples of "soft links."

Once a record (data node) has been analyzed for links, it and its other linked nodes are grouped together in a network that corresponds to a specific entity. As discussed earlier, in many (if not most) cases a data node may consist of the data from a single data record received from a data source. In some cases, several different data records may be filtered and combined to create a single data node.

At the next step 1420, the various data nodes and links are refined based, for example, on the degree of confidence that they are in fact related. As mentioned earlier, a predetermined level of required closeness or similarity can be designed or built into the link analysis, with links confirmed or discarded based on whether they meet the predetermined level or threshold. However, even the nodes found at this point to be linked because of meeting the threshold may still have wide variance in closeness or confidence in the linkage. At step 1420, each of the nodes and links among the pool of created networks are examined to identify candidate networks based, at least in part, on the confidence that the determined link or links and the related entity or entities match a predetermined criterion, such as fraud risk, failure risk, transactional risk, reliability risk, or any other desired criterion. Indicia such as an ordinal score or ranking may be assigned to reflect how closely a candidate network matches the predetermined criterion, and these score indicia may be utilized to prioritize the investigation of entities that are linked within candidate networks, as the process illustrates in steps 1422 and 1426.

At step 1422, each of the data node networks are further analyzed based on the scored degree of confidence or scoring indicia. Where an identified candidate network receives a high score (i.e., high degree of confidence that it approximates a predetermined threshold), then it may be prioritized for more urgent analysis compared to candidate networks having lower scores. However, when the score at step 1420 is relatively low, an analysis could still be done albeit with less priority, or updated dynamically as network topology changes based on changes to the data from the data sources 1320.

The data nodes and candidate networks identified and scored at step 1420 are further prioritized for risk at step 1421 (FIG. 14A), taking into account the purpose for which the data user is accessing the system 1300. For example, if a financial transaction, such as a check deposit, is to be analyzed for risk of fraud, the processing system 1340 could review the data nodes and network associated with a specific entity (account number, account holder, etc.) and assign a risk score reflecting the likelihood that the entity is involved in check fraud. That fraud risk score could be determined based on known techniques that, e.g., use various account data to predict fraud risk. However, in this instance, the risk score is not based only on account data, but also on other data at all the other nodes in the network. The risk score associated with a data node or network may be stored in system 1300 along with the corresponding data node and network, and with each candidate network, a network identifier such as a task identifier may be stored as well to act as a common key field or point of identification.

Also, different risk scores could be assigned to the same entity and its data node network to accommodate different purposes for accessing the data. As mentioned above, one risk score could be determined and calculated for inquiries relating to deposit of checks. On the other hand, if an inquiry to the system 1300 were from a mortgage company relating to a mortgage application by the same entity, a second, different risk score might be calculated, stored and accessed (that second risk score might be based on data more relevant to real estate, such as the market value of property owned by the entity and the outstanding balances on existing mortgagees taken out by the entity). As another example, if the inquiry to system 1300 were from a retail merchant in connection with a debit card presented during a retail transaction, a third risk score (based or weighted to give more consideration to data pertinent to retail transactions) might be calculated, stored and accessed.

In an alternative embodiment, rather than only analyzing a large number data records at one time in a batch mode, the process could be dynamic or a combination of a batch mode with dynamic updates. For example, after candidate networks have been identified and scored (steps 1414, 1420, 1421), when a new data record is received from one of the data sources 1320, that new record can be analyzed in conjunction with previous data and, if appropriate, new networks, nodes and links and scores can be established in response to the new data record, and a reprioritization of the candidate networks (steps 1421, 1422) can take place.

Figure 17:
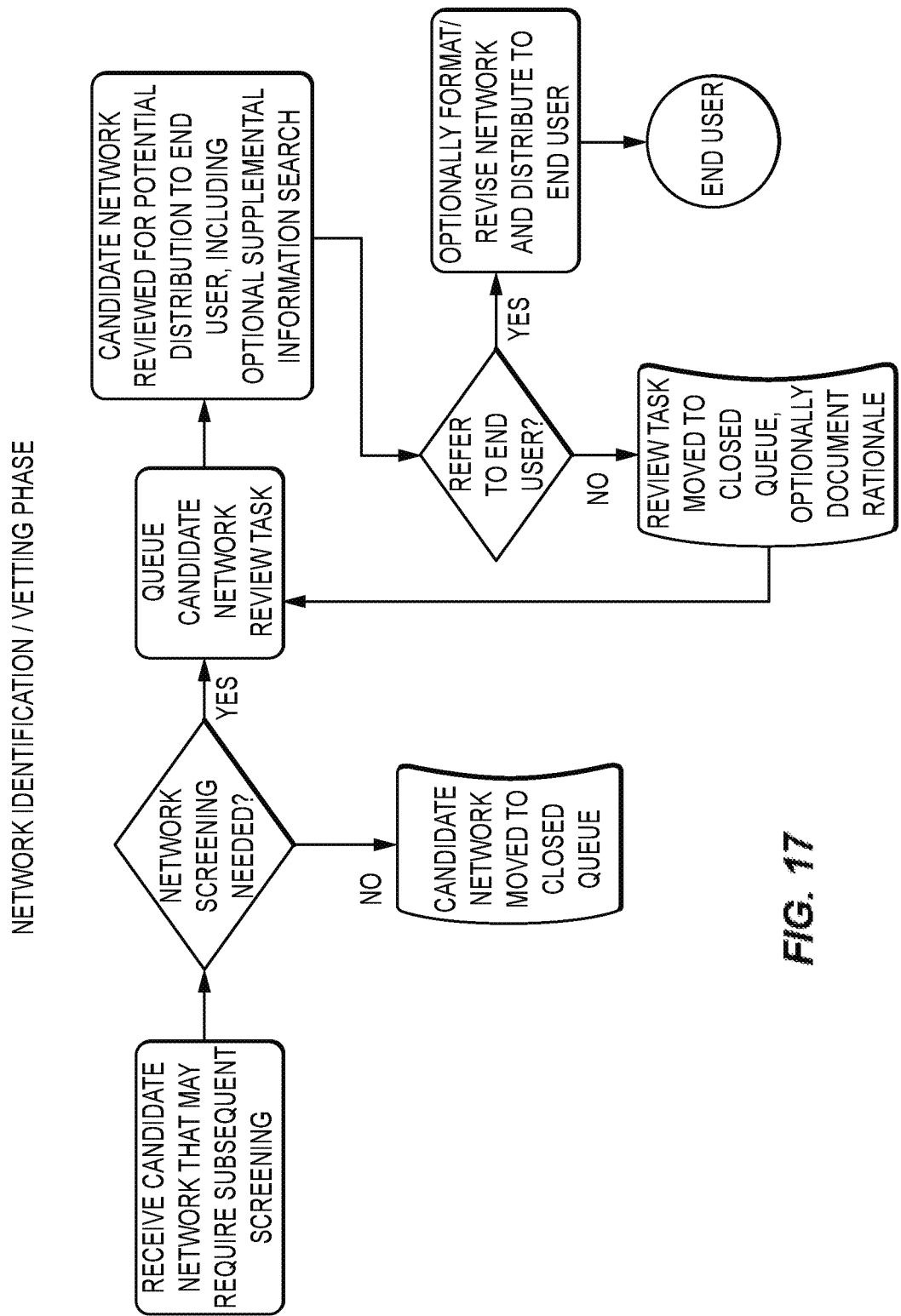
FIG. 17 shows an illustration of a process for network identification and vetting of network candidates before such network candidates are referred to a data (end) user.
Figure 18:
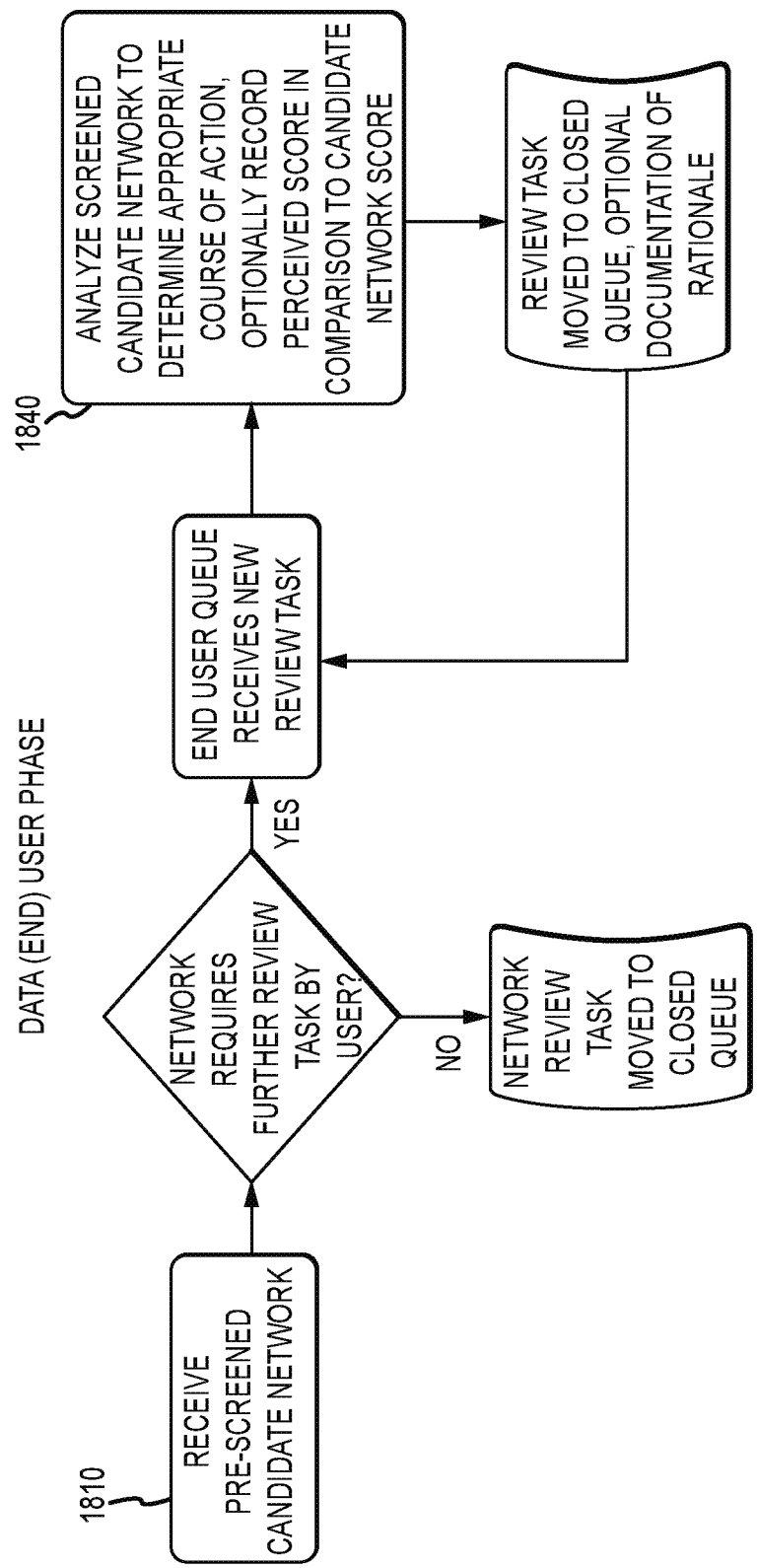
FIG. 18 illustrates a method for data (end) users to receive screened candidate networks and review those networks within a priority management queue.

As those of skill in the art appreciate, extensive amounts of input data may result in a large network that is difficult for a data user to analyze. Therefore, embodiments of the present invention identify candidate sub-networks within larger networks, and then rank those candidate networks by a priority scoring methodology as mentioned above. However, it is possible that a large number of candidate networks of high priority are identified, and require further vetting before being presented to an end user. In step 1422, a vetting process may be introduced to pre-analyze, screen, and potentially modify candidate networks that had been identified, scored, and placed in a priority queue. The vetting process may also eliminate potential false positives from the candidate networks before being submitted to the data user for further scrutiny. Further, it may be possible, for example, that a candidate network contains elements that are erroneously identified as risky elements, for instance members of a known fraudster's family, where those family members may have no other indicia of fraud associated with or linked to them. In such a case, the candidate network may be modified to suppress the low risk elements or removed from a queue altogether before being presented to a data user. In some embodiments, the further analysis at step 1422 may include a human analysis of linked nodes, and a confirmation or rejection of links based on that human analysis. In other embodiments, this further vetting or refining of networks for further review is performed in an automated or semi-automated manner, based on heuristic approaches, fuzzy logic approaches, expert system approaches, neural network approaches, or any other automated or semi-automated technique for more selectively screening candidate networks and forwarding the networks for end-user review. The vetting process is shown in FIG. 17, as associated with step 1422, and in various embodiments, a process for the data (end) user's processing methodology associated with step 1426 is illustrated in FIG. 18.

As an example of an automated vetting candidate network technique, a candidate network received in step 1810 is submitted to a neural network engine, wherein the network topology and entity attributes are input to a trained network, and a separate indicator is produced from the network which indicates whether the candidate network should be forwarded to the data (end) user. The neural network engine is trained by entering a training mode and ingesting previously scored candidate networks along with a rating of whether such networks had in fact been deemed of high interest. When such previous candidate networks were highly scored and were of high real interest to the data user, then the neural engine receives positive training reinforcement to adjust neural connection strengths. If a previous candidate network had a high score but had been of low real interest to the data user, the neural weights could be adjusted in a negative manner, indicating that future candidate networks with similar topologies should not be presented to the data user with high priority. Likewise, previous candidate networks that had been assigned low priority scores but were in fact of high real interest to the data user could result in the neural engine being trained to elevate similar networks to higher review priority for future cases. Those of skill in the art also recognize that alternative decision engines such as adaptive expert systems, heuristic engines, adjustable linear programming algorithms, or other adjustable techniques may be used to refine the list of candidate networks and associate priorities before they are presented to data users.

At step 1426, the previously linked data nodes and network are reviewed by the data (end) user to determine whether alerts or actions need to be taken. Optionally, the data user may refine the screened candidate network based on any appropriate factors such as the analysis done at step 1422. Thus, in the example given above, the three individuals found to be likely the same person have their respective data nodes now grouped together in one network.

Finally, at step 1428, the final linked nodes and networks are stored at system 1300 for subsequent access by data users 1330. For purposes of being stored and indexed in the storage device 1350, each network, node, and link may be assigned an identifier. Further, along with each candidate network reviewed by the data user, the data user may enter a perceived value score that ranks how accurately the score associated with the candidate network reflects an actual level of risk (or a perceived level of risk). The perceived score information entered by the data user in step 1840 (FIG. 18) may then be subsequently used to improve the accuracy of scoring or identification of candidate networks. For example, the perceived score information entered by the data user may be fed to learning algorithm such as the neural decision engine discussed herein, and in conjunction with the stored score value for the candidate network, an error signal can be generated that reflects the magnitude of the difference between the scored risk and the perceived score, which may then be fed forward to adjust the scoring algorithm or network weights. In this manner, the system automatically adjusts for the scoring of candidate networks that more closely match real-world end-user conditions.

Figure 15:
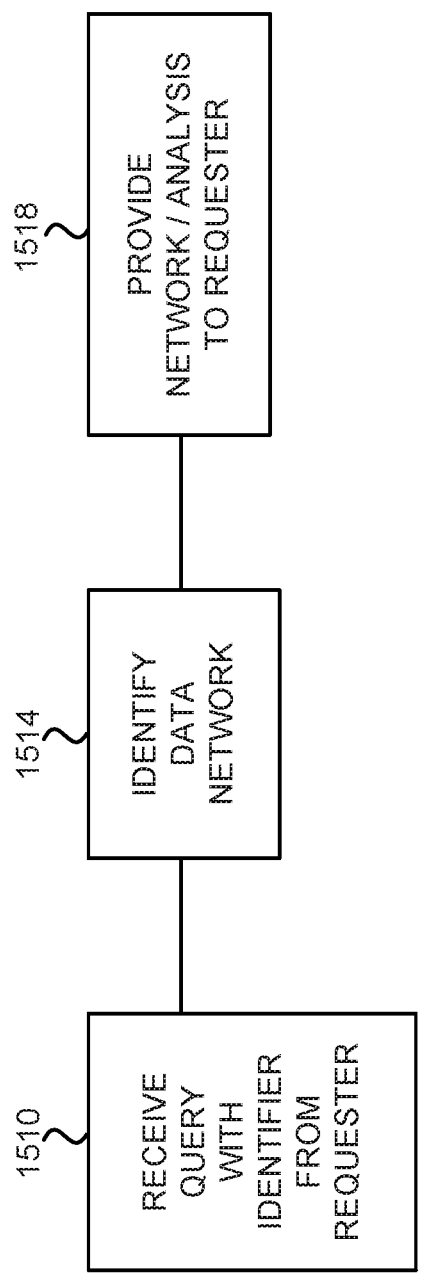
FIG. 15 is a flow diagram illustrating a process in which users access linked data networks using the system of FIG. 12.

FIG. 15 is a general flow diagram illustrating the process for accessing the system 1300 by one of the data users 1330. At step 1510, a query is received from one of the data users with an identifier for the entity of interest. As mentioned earlier, an entity could be, among other things, a person, organization, address, event, device, account, or transaction. Thus, the query could include identifiers such as a name, social security number, account number, phone number, IP address, and so forth. The system 1300 would check its database for a data node network corresponding to the entity identifier, and identify the network at step 1514.

The data network is then provided to the requester at step 1518. The data nodes could be supplied in different forms. For example, the network could be presented in graphical form as seen in FIG. 12 (using hyperlinks at each illustrated node in order to access the underlying data at that node). It could also be provided as a table with a listing of the linked data nodes and the data associated with each node. In addition to (or in lieu of) the data reflecting the network of nodes, the system could provide a risk score based on the data (taking into account the purpose for the query).

Figure 16:
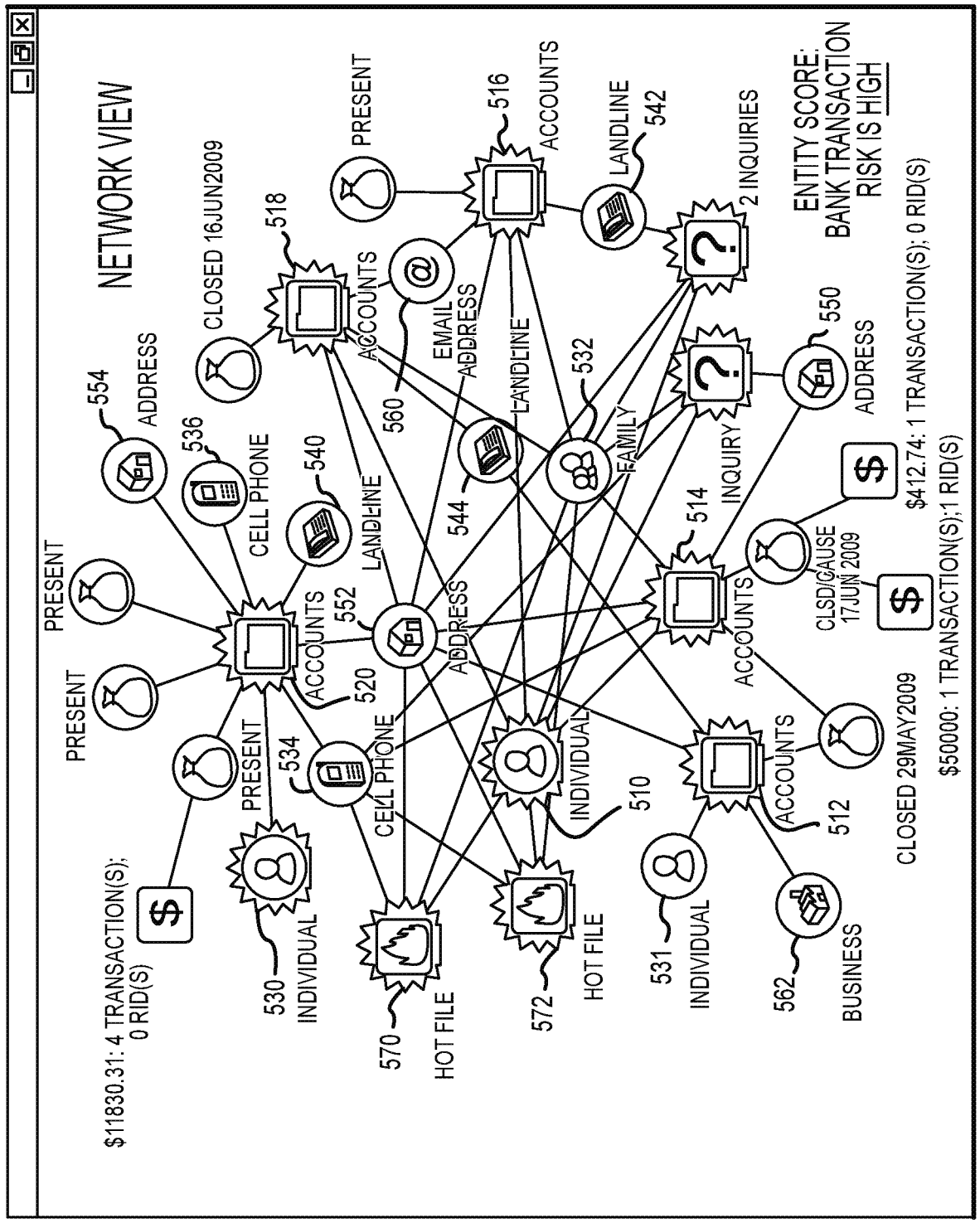
FIG. 16 is a diagram illustrating an embodiment of the invention, wherein a network of data nodes is provided to a financial institution in order to assess the risk of a financial transaction.

FIG. 16 illustrates an exemplary network of data nodes that could be provided to a financial institution in response to a query concerning a person conducting a bank transaction (such as a check deposit).

The network is presented in graphical form on a display device, with each node represented by graphical icon. Each icon can be selected to reveal data underlying that node. In this example, the entity associated with the network is an individual person, whose personal information is at node 510. There are five accounts directly or indirectly linked to the person (nodes 512, 514, 516, 518, 520). There are also linked nodes for other individuals (nodes 530, 531), family members (node 532), cell phones (nodes 534, 536), landlines (nodes 540, 542, 544), addresses (nodes 550, 552 554), an email address (node 560) and a business (node 562). Also appearing are hot files (nodes 570, 572) indicating data on fraudulent activity, and several various icons in association with each of the accounts indicating a status or event associated with that account (such nodes not individually numbered).

In this example, there is also a risk score for this entity (and corresponding network) calculated for bank transactions, displayed on the screen and indicated as "high." As an alternative, the risk score could be numerical, say "1" to "10", with "10" indicating the highest risk.

Figure 16A:
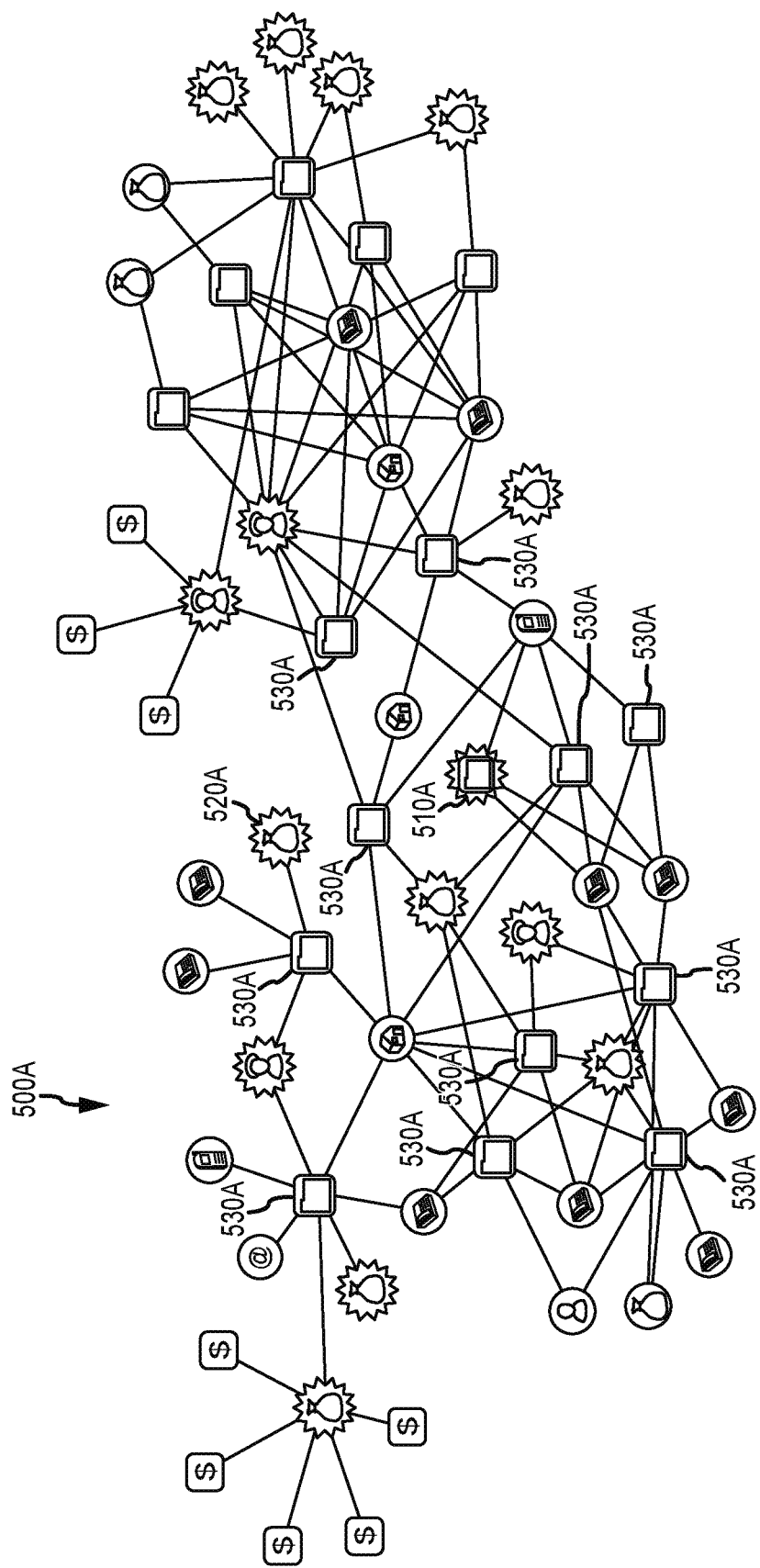
FIG. 16A depicts an exemplary low-risk candidate network.
Figure 16B:
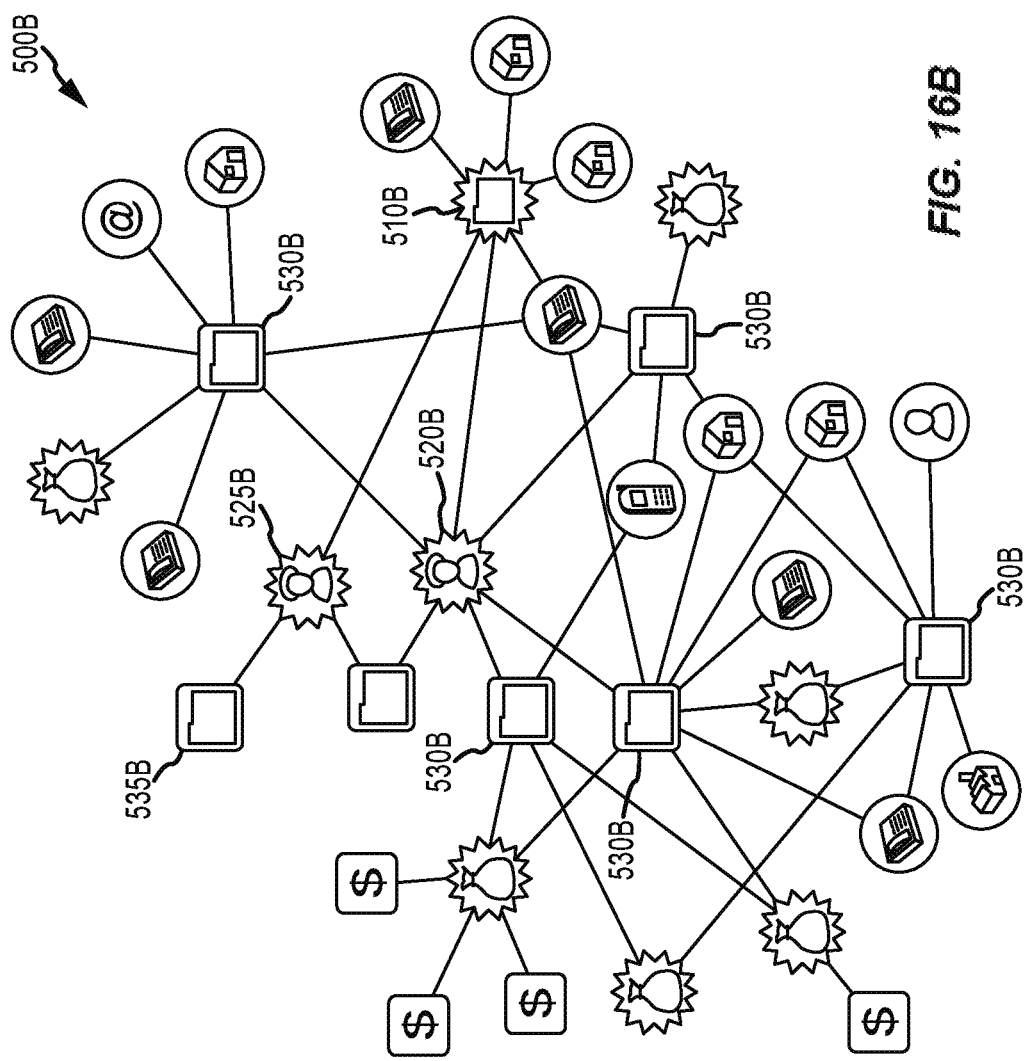
FIG. 16B depicts an exemplary moderate-risk candidate network.
Figure 16C:
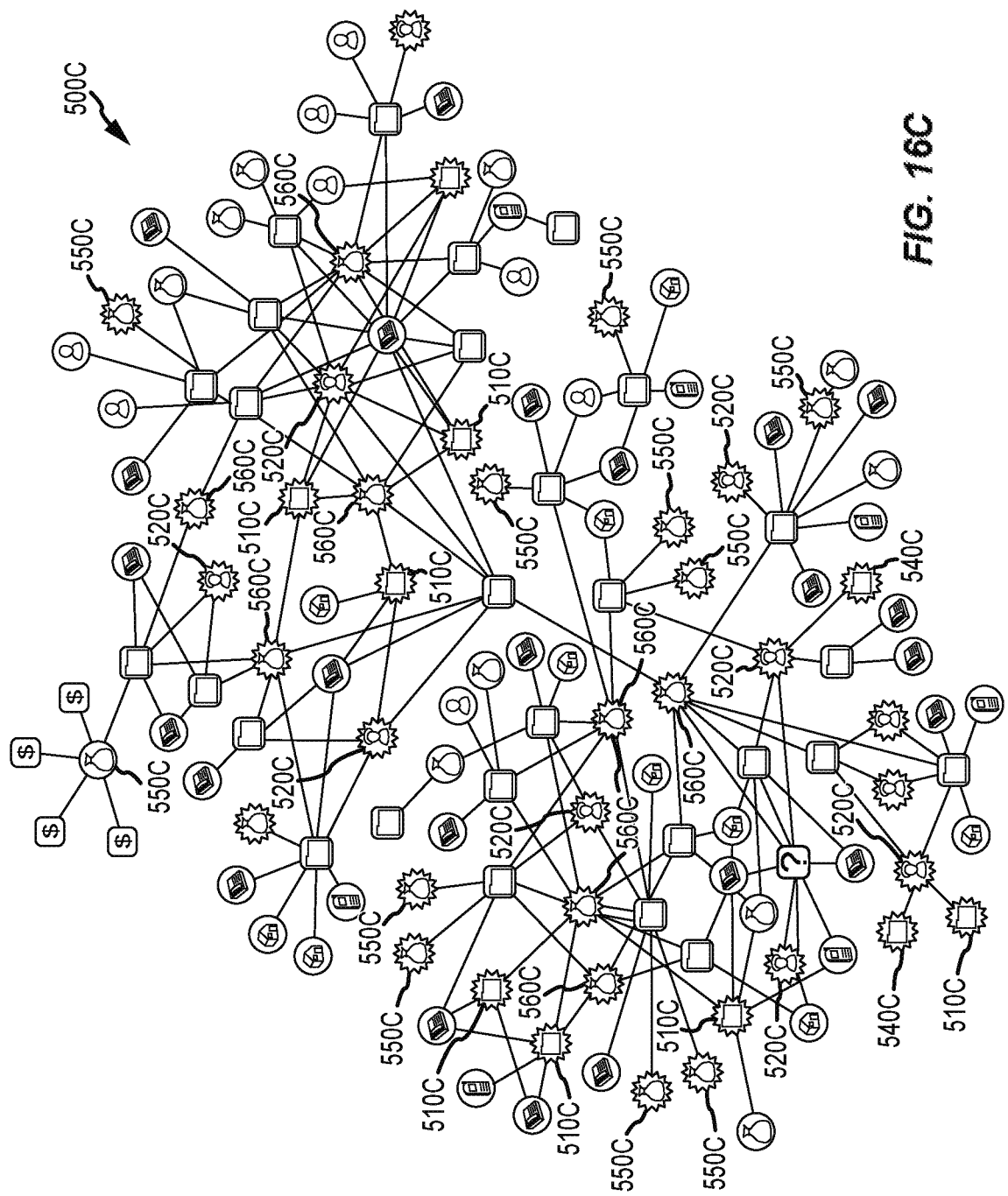
FIG. 16C depicts an exemplary high-risk candidate network.

Three examples of candidate networks with varying levels of scored risk are shown in FIGS. 16A-16C. Turning to FIG. 16A, a candidate network 500A is presented that would be considered a "low risk" based on the likelihood of fraudulent events occurring. The exemplary candidate network 500A only contains one account abuse node (510A) for a very small loss, one account that was closed for cause (520A) and no other fraud records. Even though there are several open demand deposit accounts (a.k.a. "checking" accounts) (530A) at a plurality of financial institutions, this network would normally be evaluated to produce an indicia of low to very risk. The reviewing or vetting process would take into account the date and amount of the account abuse as it is not always fraud but could be bad account management. Also, the vetting process would consider which entity contributed the account abuse, and if the financial institution still had open accounts for the abusing entity, it is likely the institution would not consider the abusing entity fraudulent.

FIG. 16B depicts an exemplary candidate network 500B that would result in a moderate level of scored risk. The moderate-risk-scored candidate network 500B has one shared fraud record (510B) that has been recently reported on two individuals (520B, 525B) in this network 500B. Both of these individuals (520B, 525B) currently have open DDA accounts at a plurality of financial institution (530B, 535B). Even though there is only one fraud record 510B, because it is a shared fraud and was recently contributed, that factor combined with the six open DDA accounts (530B, 535B) at a variety of financial institutions raises the scored risk level to a moderate level.

FIG. 16C depicts a high risk scored candidate network 500C. There are eight individuals (520C) that share attributes such as: a cell phone, a landline, or an email address (shown but not annotated with reference numerals for clarity). This candidate network 500C also contains seven shared fraud records (510C) contributed by multiple financial institutions. The candidate network 500C also contains two account abuse records (540C) with over $3,000.00 in losses and eleven accounts that have been closed for cause (550C). Also contributing to the risk of this network are over $10,000 in returned transactions or RID's. The candidate network 500C also has six open DDA accounts (660A). With the combined risk factors described in regards to candidate network 500C, this network would be scored as a high risk network, and entities including individuals in the network should be scrutinized carefully by the data (end) user.

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the data linking and analysis system 1300 may be implemented by a single system having one or more storage device and processing elements. Alternatively, the data linking and analysis system 1300 could be implemented by plural systems, with its functions distributed across different systems either in one location or across a plurality of linked locations.

Moreover, while the various flows and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A system comprising:
   a database storing data for accounts from a plurality of institutions that correspond to a plurality of data records, wherein the database is maintained by an asset verification service separate from and serving more than one of the institutions, the stored data for each respective account comprising at least a personal identifier for an account holder of that respective account, and the database also storing negative contributed information received from one or more sources about a number of account holders; and
   a communications system; and
   a data linking and analysis system comprising a processing system and configured to:
   receive via the communications system from a loan originator a request to locate assets, the request including a submitted personal identifier;
   process the request and attribute a purpose to the request based at least in part on identifying a subject of the request, where the attributed purpose of the request is differentiated from one or more other purposes attributable by the processing system to requests received by the processing system, and where a particular type of risk corresponding to the subject of the request is particularized to the attributed purpose;
   search the database, using the submitted personal identifier, to identify one or more accounts, and then construct a network data structure of data nodes linked in a network of data nodes relating to an entity mapped to the submitted personal identifier, the network of data nodes constructed so that each data node of the network of data nodes corresponds to one or more data records of the plurality of data records and the data nodes are linked based at least in part on processing of data elements from multiple data records to identify subsets of the data elements from multiple data records having shared or similar characteristics,
   where each data node comprises one or more selectable links to access underlying data at the respective data node, the underlying data of at least one of the data nodes comprising a respective subset of the data elements from the multiple data records of the plurality of data records;
   automatically locate one or more accounts at one or more of the institutions by matching the submitted personal identifier to a personal identifier accessible via the network of data nodes for the one or more located accounts;
   retrieve one or more items of the underlying data that is associated with the one or more located accounts;
   retrieve from the database at least some of the negative contributed information associated with the submitted personal identifier;
   the retrieved negative contributed information being associated with the particular type of risk corresponding to the attributed purpose associated with the subject of the request;
   produce a report, the report indicating the assets contained in the one or more located accounts, the report also including at least some of the negative contributed information; and
   provide the report to the loan originator from which the request to locate assets was received, the providing the report comprising indicating the particular type of risk corresponding to the attributed purpose associated with the subject of the request.

2. The system of claim 1, wherein the data linking and analysis system is further configured to:
   ascertain that at least one of the one or more located accounts is jointly held by an account holder identified by the submitted personal identifier and another person;
   retrieve from the database negative contributed information associated with the other person; and
   include in the report at least some of the negative contributed information associated with the other person.

3. The system of claim 2, wherein the report further indicates a pattern of deposits into at least one of the one or more located accounts.

4. The system of claim 1, wherein the entity from which the request to locate assets was received is a first requesting entity, and wherein the data linking and analysis system is further configured to:
   receive, from a second requesting entity at a time later than the production of the report, a request for information contained in the report, the request including an identifier of the report; and provide information contained in the report to the second requesting entity.

5. The system of claim 4, wherein the second requesting entity is a government sponsored enterprise.

6. The system of claim 1, wherein the data linking and analysis system is further configured to:
identify patterns of deposits into at least two accounts of the one or more located accounts; and
estimate an income of a person identified by the submitted personal identifier based at least in part on the patterns of deposits into the at least two accounts.

7. The system of claim 6, wherein the at least two accounts are not all held at the same financial institution.

8. The system of claim 6, wherein the at least two accounts comprise a checking account and a savings account.

9. The system of claim 1, wherein the negative contributed information received from one or more sources includes negative contributed information received from one or more financial institutions.

10. The system of claim 1, wherein the negative contributed information received from one or more sources includes negative contributed information received from public records.

11. The system of claim 1, wherein the negative contributed information received from one or more sources includes negative contributed information received from a news report.

12. A computer-implemented method comprising:
providing a database;
storing, in the database, account data for accounts maintained at a plurality of institutions that correspond to a plurality of data records, wherein the database is maintained by an asset verification service separate from and serving more than one of the institutions, the account data for each respective account comprising at least a personal identifier for an account holder of that respective account, and storing in the database negative contributed information received from one or more sources about the account holders of at least some of the accounts;
receiving via a communications system from a loan originator a request to locate assets, the request including a submitted personal identifier;
processing by a data linking and analysis system the request and attribute a purpose to the request based at least in part on identifying a subject of the request, where the attributed purpose of the request is differentiated from one or more other purposes attributable by the data linking and analysis system to requests received by the data linking and analysis system, and where a particular type of risk corresponding to the subject of the request is particularized to the attributed purpose;
searching the database, using the submitted personal identifier, to identify one or more accounts, and then construct a network data structure of data nodes linked in a network of data nodes relating to an entity mapped to the submitted personal identifier, the network of data nodes constructed so that each data node of the network of data nodes corresponds to one or more data records of the plurality of data records and the data nodes are linked based at least in part on processing of data elements from multiple data records to identify subsets of the data elements from multiple data records having shared or similar characteristics, where each data node comprises one or more selectable links to access underlying data at the respective data node, the underlying data of at least one of the data nodes comprising a respective subset of the data elements from the multiple data records of the plurality of data records;
automatically locating using a processor one or more accounts at one or more of the institutions by matching the submitted personal identifier to a personal identifier accessible via the network of data nodes for the one or more located accounts;
retrieving one or more items of the underlying data that is associated with the one or more located accounts;
retrieving from the database at least some of the negative contributed information associated with the submitted personal identifier;
the retrieved negative contributed information being associated with the particular type of risk corresponding to the attributed purpose associated with the subject of the request;
producing a report, the report indicating the assets contained in the one or more located accounts, the report also including at least some of the negative contributed information; and
providing the report to the loan originator from which the request to locate assets was received, the providing the report comprising indicating the particular type of risk corresponding to the attributed purpose associated with the subject of the request.

13. The computer-implemented method of claim 12, wherein the entity from which the request to locate assets was received is a first requesting entity, and wherein the computer-implemented method further comprises:
receiving, from a second requesting entity at a time later than the production of the report, a request for information contained in the report, the request including an identifier of the report; and
providing information contained in the report to the second requesting entity.

14. The computer-implemented method of claim 13, wherein the second requesting entity is a government sponsored enterprise.

15. The computer-implemented method of claim 12, further comprising:
ascertaining that at least one of the one or more located accounts is jointly held by an account holder identified by the submitted personal identifier and another person;
retrieving from the database negative contributed information associated with the other person; and
including in the report at least some of the negative contributed information associated with the other person.

16. The computer-implemented method of claim 12, further comprising:
receiving a mortgage application from an applicant, the mortgage application including personal identifying information about the applicant;
transmitting the personal identifying information about the applicant via an electronic network to an asset location and verification service provider;
receiving via the electronic network a report from the asset location and verification service provider, the report including information about assets owned by or associated with the applicant;
making a determination, based in part on the report, to approve the mortgage application; and sending an identifier of the report, but not content of the report, directly to a government sponsored enterprise.

\* \* \* \* \*